United States Patent
Ueda

(10) Patent No.: US 10,185,210 B2
(45) Date of Patent: Jan. 22, 2019

(54) LUMINOUS LIGHT EMITTING DEVICE, LIGHT SOURCE UNIT AND IMAGE PROJECTION SYSTEM

(71) Applicant: CASIO COMPUTER CO., LTD., Tokyo (JP)

(72) Inventor: Tomoyuki Ueda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/454,889

(22) Filed: Mar. 9, 2017

(65) Prior Publication Data

US 2017/0357150 A1   Dec. 14, 2017

(30) Foreign Application Priority Data

Jun. 9, 2016   (JP) .................................. 2016-114991

(51) Int. Cl.
| | |
|---|---|
| G03B 21/16 | (2006.01) |
| F21V 29/502 | (2015.01) |
| F21V 29/70 | (2015.01) |
| G02B 26/00 | (2006.01) |
| G03B 21/20 | (2006.01) |

(52) U.S. Cl.
CPC ............ *G03B 21/16* (2013.01); *F21V 29/502* (2015.01); *F21V 29/70* (2015.01); *G02B 26/008* (2013.01); *G03B 21/204* (2013.01)

(58) Field of Classification Search
CPC ....... G03B 21/16; G03B 21/204; F21V 29/70; F21V 29/502; G02B 26/008
See application file for complete search history.

(56) References Cited

U.S. PATENT DOCUMENTS

| | | | |
|---|---|---|---|
| 2002/0003704 A1* | 1/2002 | Ohmae | F21S 10/007 362/293 |
| 2003/0131970 A1* | 7/2003 | Carter | B21C 23/10 165/80.3 |
| 2008/0079853 A1 | 4/2008 | Hwang et al. | |
| 2009/0034105 A1* | 2/2009 | Ho | G02B 7/008 359/892 |
| 2015/0085260 A1* | 3/2015 | Hu | G03B 21/16 353/61 |

FOREIGN PATENT DOCUMENTS

| | | | | |
|---|---|---|---|---|
| JP | 2002-90886 A1 | 3/2002 | | |
| JP | 2012013897 A | * 1/2012 | ............. | G03B 21/14 |
| JP | 2015-222300 A | 12/2015 | | |
| JP | 2016-66061 A | 4/2016 | | |

OTHER PUBLICATIONS

Japanese Office Action dated Nov. 30, 2017. issued in corresponding Japanese Patent Application No. 2016-114991. (9 pages).

* cited by examiner

*Primary Examiner* — Sultan Chowdhury
*Assistant Examiner* — Magda Cruz
(74) *Attorney, Agent, or Firm* — Fitch, Even, Tabin & Flannery LLP

(57) ABSTRACT

A luminous light emitting device according to an aspect of the invention includes a motor, a luminescent wheel which is rotated by the motor, and a wheel cover which covers part of the luminescent wheel, and the wheel cover has a plurality of internal heat dissipating plates which are disposed so as to extend from a central portion towards an outer circumference of the luminescent wheel in an inside thereof.

23 Claims, 15 Drawing Sheets

LUMINOUS LIGHT EMITTING DEVICE, LIGHT SOURCE UNIT AND IMAGE PROJECTION SYSTEM

CROSS-REFERENCE TO RELATED APPLICATION

This application is based upon and claims the benefit of priority under 35 USC 119 from Japanese Patent Application No. 2016-114991 filed on Jun. 9, 2016, the entire disclosures of which, including the specification, claims, drawings and abstract, are incorporated herein by reference.

BACKGROUND OF THE INVENTION

Field of the Invention

The present invention relates to a luminous light emitting device, a light source unit including this luminous light emitting device, and an image projection system including this light source unit.

Description of the Related Art

In an image projection system in which laser light emitting devices are used as a light source to emit laser light and luminous light which is produced to be emitted by exciting a luminescent material using the laser light as excitation light so as to form bright image forming light source light by combining the laser light and the luminous light together to thereby emit highly bright image light, in the event that optical members which are incorporated in a light source unit get dirty as a result of the passage of time, there may occur a situation in which the brightness of an image is deteriorated although it is slight. As this occurs, various problems are caused which include deterioration not only in brightness but also in tonality and definition of a projected image, an increase in calorific power in an optical system and the like.

To deal with those problems, the applicant of this patent application proposed a light source unit and a projector in Japanese Unexamined Patent Publication No. 2015-222300. In this light source unit, a light source of lights of the three primary colors is provided by combining together a light source which includes a plurality of laser light emitting devices and a rotatable luminescent plate of a luminescent material in a combined fashion and a light source made up of a red light emitting diode. Then, the light source of lights of the three primary colors, a display device such as a digital micromirror device (DMD) which forms image light and a projection lens which makes up a projection optical system are accommodated in an interior of an optical unit, and the light source devices and the optical devices are sealed in the interior of the optical unit to protect them from dirt. In addition, heat from the various heat sources can be dissipated effectively.

Then, the proposed projector includes various heat sources such as a control circuit which is a projector control unit which includes a CPU configured as an arithmetic unit and a power supply circuit which supplies electric power to the light source unit. In addition to these heat sources, the projector includes the light emitting sources such as the laser light emitting devices and the light emitting diode and the rotatable luminescent plate onto which the laser lights are collected. These light emitting sources and the luminescent plate also have great calorific power. Thus, various heat dissipating measures are taken in this projector.

Japanese Unexamined Patent Publication No. 2002-090886 relates to a color wheel which resembles a luminescent wheel of a luminescent material which is a rotatable luminescent plate of a luminescent material and proposes a technique to enhance the heat dissipating effect of the color wheel by accommodating the color wheel in a tightly closed case and providing heat dissipating fins on an external surface of the case.

With the light source unit which uses the semiconductor light emitting devices such as the laser light emitting devices and the luminous light emitting plate made up of the luminescent material, it is easy to form bright lights of the three primary colors to thereby enable the projection of a bright image.

However, the light sources with high luminance brightness have great calorific power, thereby making it difficult for those light sources to make up a light source unit which is small in size and which exhibits high cooling and heat dissipating effects.

In particular, the heat dissipation of a member like the luminescent wheel which is driven to rotate is different from the heat dissipation of the fixed portions such as the projector control circuit, the power supply circuit and the light emitting devices, and it is difficult to dissipate heat from the rotary member effectively. In the event that the temperature of the luminescent wheel is raised, there is the possibility that problems are caused which include a reduction in luminous efficiency and a quick deterioration of the luminescent material to shorten the life thereof.

SUMMARY OF THE INVENTION

The invention has been made in view of the problems described above which are inherent in the related art, and an object thereof is to provide a light source unit which includes a luminous light emitting device which can dissipate heat of a luminescent wheel which is an optical member of the light source unit which is driven to rotate in an ensured fashion and an image projection system which includes this light source unit.

According to an aspect of the invention, there is provided a luminous light emitting device including a motor, a luminescent wheel which is rotated by the motor, and a wheel cover which covers part of the luminescent wheel, wherein the wheel cover has a plurality of internal heat dissipating plates which are disposed so as to extend from a central portion towards an outer circumference of the luminescent wheel in an inside thereof.

According to another aspect of the invention, there is provided a light source unit having the luminous light emitting device described above, an excitation light shining device, and a semiconductor light emitting device which emits light in a wavelength range which is different from a wavelength range of luminous light which is emitted from the luminescent wheel.

According to a further aspect of the invention, there is provided an image projection system having the light source unit described above, a display device which forms image light when light emitted from the light source unit is shone onto the display device, a projection optical system which projects the image light formed by the display device onto a screen, and a projector control unit for controlling the display device and the light source unit.

DETAILED DESCRIPTION OF THE PREFERRED EMBODIMENTS

[First Embodiment]

Figure 1:
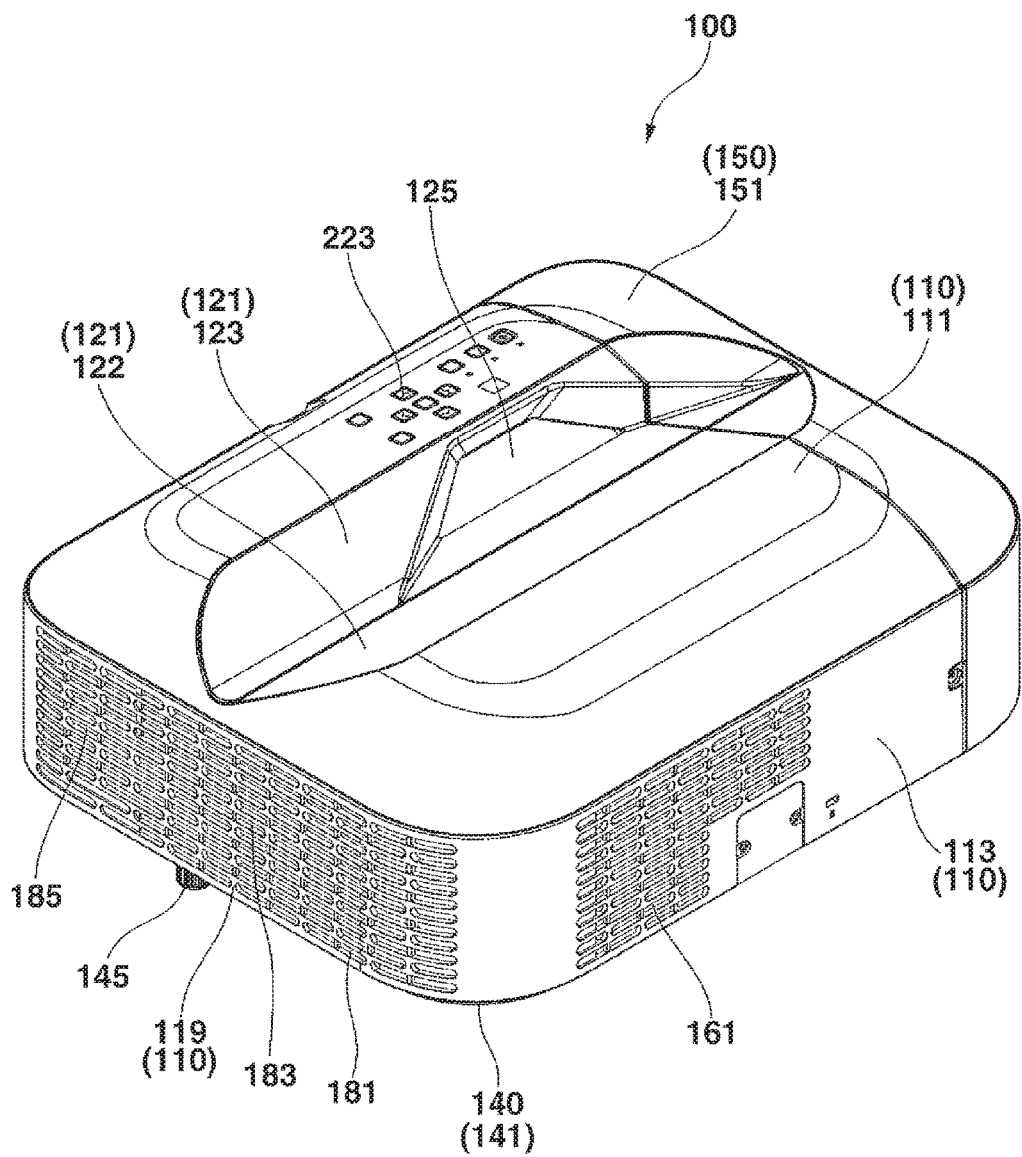
FIG. 1 is an external perspective view of an example of a projector according to a first embodiment of the invention showing an external appearance thereof.

Hereinafter, a first embodiment of the invention will be described based on the drawings. FIG. 1 is an external perspective view of a projector 100 which is an image projection system. In this embodiment, when referred to in relation to the projector 100, left and right denote, respectively, left and right in relation to the projecting direction of the projector 100, and when referred to in relation to the projector 10, front and rear denote, respectively, front and rear in relation to the projecting direction of the projector 100. In addition, in FIG. 1, a right downward direction denotes a front of the projector 100.

In a detailed description of a luminous light emitting device, which will be made later, the direction of a surface of a luminescent wheel where a luminescent material area is formed and on which excitation light is incident will be described as a front of the luminescent wheel.

Figure 2:
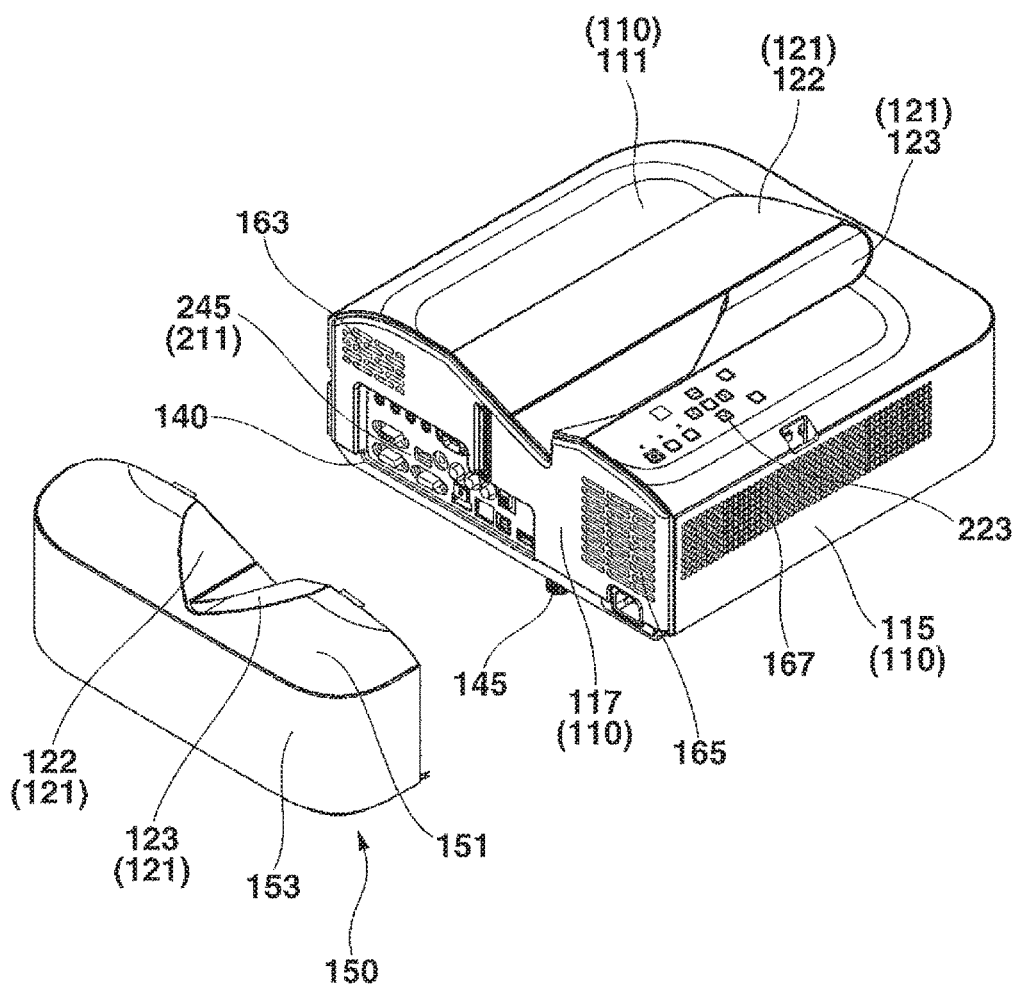
FIG. 2 is a rear external perspective view of the projector according to the first embodiment of the invention showing a rear external appearance thereof with a connector cover removed.

The image projection system is, as shown in FIGS. 1 and 2, the projector 100 which has a substantially rectangular parallelepiped shape. Various types of devices and circuit boards are fixed to an upper surface of a bottom plate 141 of a lower case 140 of the projector 100 and are then covered by an upper case 110. FIG. 2 is a rear external perspective view of the projector 100 which results when a rear surface of the projector 100 is seen obliquely downwards from thereabove with a connector cover 150 removed.

Then, front outside air inlet holes 161 are formed in a front panel 113 of the upper case 110 which makes up a casing of the projector 100 shown in FIG. 1. Front inside air outlet holes 181, central inside air outlet holes 183 and rear inside air outlet holes 185 are formed at a front portion, a central portion and a rear portion of a right panel 119, respectively.

Legs 145 each including a threaded portion are attached to three locations on the bottom plate 141 so as to adjust the height of the projector 100.

In addition, a keys/indicators unit 223 is provided on an upper panel 111 of the upper case 110. Disposed on this keys/indicators unit 223 are keys and indicators which include a power supply switch key, a projection switch key, a power indicator, an overheat indicator, and the like. The projection switch key switches on or off the projection by the projector 100. The power indicator informs whether a power supply is on or off. The overheat indicator informs of an overheat condition occurring in a light source unit, a display device, a control unit or the like when they really overheat.

Further, a V-shaped cut groove 121 made up of a front inclined portion 122 and a rear inclined portion 123 is formed on the upper panel 111 of the upper case 110 so as to extend in a left-and-right or transverse direction thereof. A projection port 125 is formed in the rear inclined portion 123, so that image light can be emitted obliquely to the front from the projection port 125.

The cut groove 121 is formed so as to extend from the upper panel 111 of the upper case 110 to an upper surface portion of the connector cover 150.

The projector casing is formed of a casing main body which is made up of the upper case 110 and the lower case 140 and the connector cover 150 which can be detachably attached to the casing main body so as to cover a left panel of the casing main body.

Then, the connector cover 150 has the upper surface portion 151 and a side surface portion 153 which is provided along a circumferential edge of the upper surface portion 151 so as to extend downwards therefrom so that a left panel 117 of the upper case 110 can be covered by the connector cover 150. The connector cover 150 has opening portions which are formed in a lower surface portion and a right side surface thereof, so that cords of various connectors which are connected to an input/output connector unit on a left panel 117 of the upper case 110 can be led out therethrough.

As shown in FIG. 2, the projector 100 has the input/output connector unit 211 which is provided on the left panel 117 of the upper case 110 which is situated inside the connector cover 150. Then, (groups of) various types of terminals are provided on a connector board 245 which include an SB (seal bus) terminal, a video signal input D-SUB terminal into which analog RGB video signals are inputted, an S terminal, an RCA terminal, a voice output terminal, a power supply adaptor and a plug. Front side outside air inlet holes 163 are provided at a front portion of the left panel 117, and rear side outside air inlet holes 165 are provided at a rear portion of the left panel 117.

Further, rear outside air inlet holes 167 are also provided in a back panel 15 of the upper case 110. Some of the rear outside air inlet holes 167 which are situated near a right end of the back panel 15 double as holes of a speaker from which voice or sound is expelled.

Figure 3:
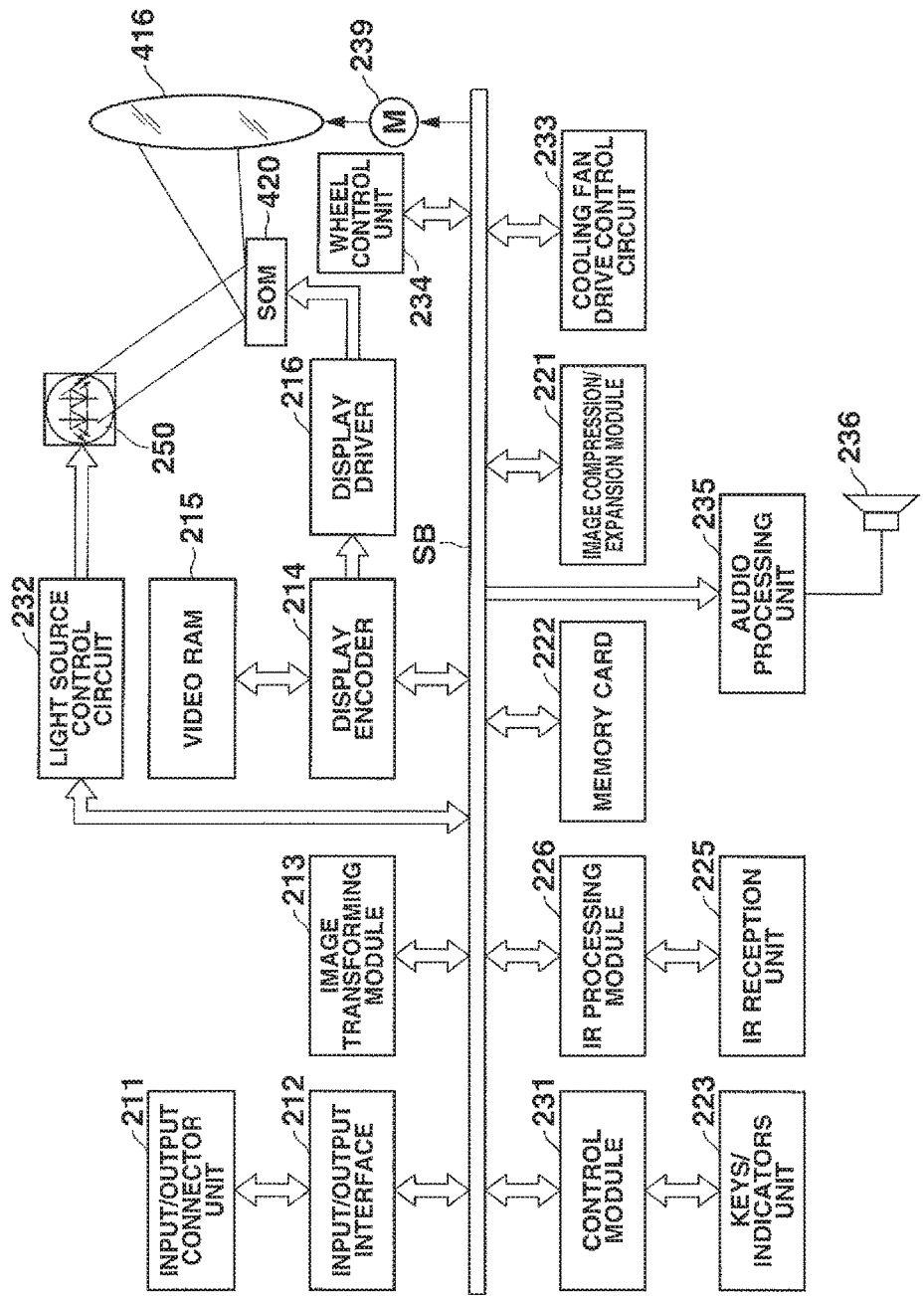
FIG. 3 is a block diagram showing functional blocks of the projector according to the first embodiment of the invention.

Next, a projector control unit of the projector 100 will be described by the use of a functional block diagram shown in FIG. 3.

The projector control unit includes a control module 231, an input/output interface 212, an image transforming module 213, a display encoder 214, a display driver 216 and the like.

Image signals of various standards which are inputted from the input/output connector unit 211 are sent via the input/output interface 212 and a system bus (SB) to the image transforming module 213 where the image signals are transformed so as to be unified into an image signal of a predetermined format which is suitable for display by the projector control unit. Thereafter, the image signals so transformed are outputted to the display encoder 214.

Then, this control module 231 governs the control of respective operations of circuitries within the projector 100 and is made up of a CPU configured as an arithmetic unit, a ROM which stores in a fixed fashion operation programs of various types of settings, a RAM which is used as a working memory and the like.

The display encoder 214 deploys the image signals that have been inputted thereinto on a video RAM 215 for storage therein and generates a video signal from the contents stored in the video RAM 215, outputting the video signal so generated to the display driver 216.

The display driver 216 functions as a display device control module. The display driver 216 drives a display device 420, which is a spatial optical modulator (SOM), at an appropriate frame rate in response to an output of the image signal from the display encoder 214.

As will be described in detail, this projector 100 includes a light source unit 250 which includes a main light source module 330 which has an excitation light shining device 310, a luminous light emitting device 331, a red light source device 350 and a light guiding optical system 370, and a light source-side optical device 380 having a light tunnel 383 and the like.

Then, this projector 100 shines a pencil of light emitted from the main light source module 330 of the light source unit 250 onto the display device 420 via the light source-side optical device 380 of the light source unit 250, whereby an optical image is formed by using reflected light which is reflected by the display device 420. The image so formed is then projected onto a screen for display thereon via a projection-side optical system, which will be described later.

In addition, a movable lens group 416 of the projection-side optical system is driven by a lens motor 239 for zooming or focusing.

When the projector 100 is in a reproducing mode, an image compression/expansion unit 221 performs the following operations. The image compression/expansion unit 221 reads out image data recorded on a memory card 222 and expands individual image data which make up a series of dynamic images frame by frame. Then, the image compression/expansion unit 221 outputs the image data to the display encoder 214 via the image transforming module 213 so as to enable the display of dynamic images and the like based on the image data stored on the memory card 222.

Then, operation signals generated at the keys/indicators unit 223 which is provided on the upper case 110 of the casing are sent out directly to the control module 231. Key operation signals from a remote controller are received by an IR reception unit 225, and a code signal demodulated at an IR processing unit 226 is outputted to the control module 231.

An audio processing unit 235 is connected to the control module 231 via the system bus (SB). This audio processing unit 235 includes a circuitry for a sound source such as a PCM sound source or the like. When the projector 100 is in a projection mode and the reproducing mode, the audio processing unit 235 converts audio data to analog signals and drives a speaker 236 to output loudly sound or voice based on the audio data.

The control module 231 controls a light source control circuit 232 which is configured as a light source control unit. The light source control circuit 232 controls not only the emission of light from each of the excitation light shining device (an excitation light source) 310 and the red light source device 350 of the light source unit 250 but also the rotation of a luminescent wheel 333 of the luminous light emitting device 331 via a wheel control unit 234 so that light source lights in the predetermined or red, green and blue wavelength ranges which are required in producing an image are emitted from the main light source module 330 of the light source unit 250.

Further, the control module 231 causes a cooling fan drive control circuit 233 to detect temperatures through a plurality of temperature sensors which are provided in the light source unit 250 so as to control the rotating speeds of cooling fans based on the results of the temperature detections.

Additionally, the control module 231 also causes the cooling fan drive control circuit 233 to keep the cooling fans rotating by use of a timer even after the power supply to the main body of the projector 100 is switched off. Alternatively, the control module 231 causes the cooling fan drive control circuit 233 to cut off the power supply to the main body of the projector 100 depending upon the results of the temperature detections by the temperature sensors.

Figure 4:
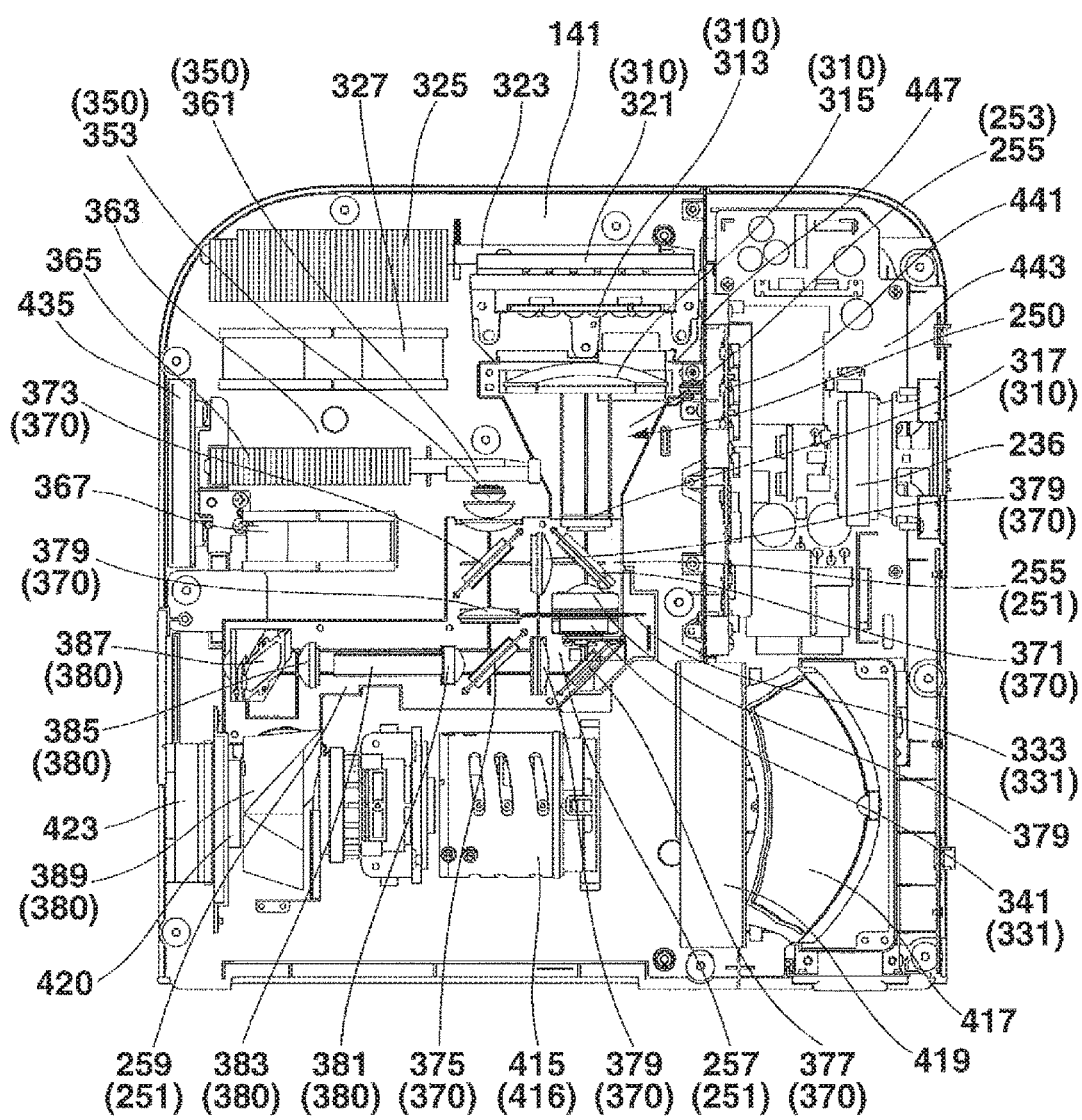
FIG. 4 is a schematic plan view showing an internal construction surrounding an optical system of the projector according to the first embodiment of the invention.
Figure 5:
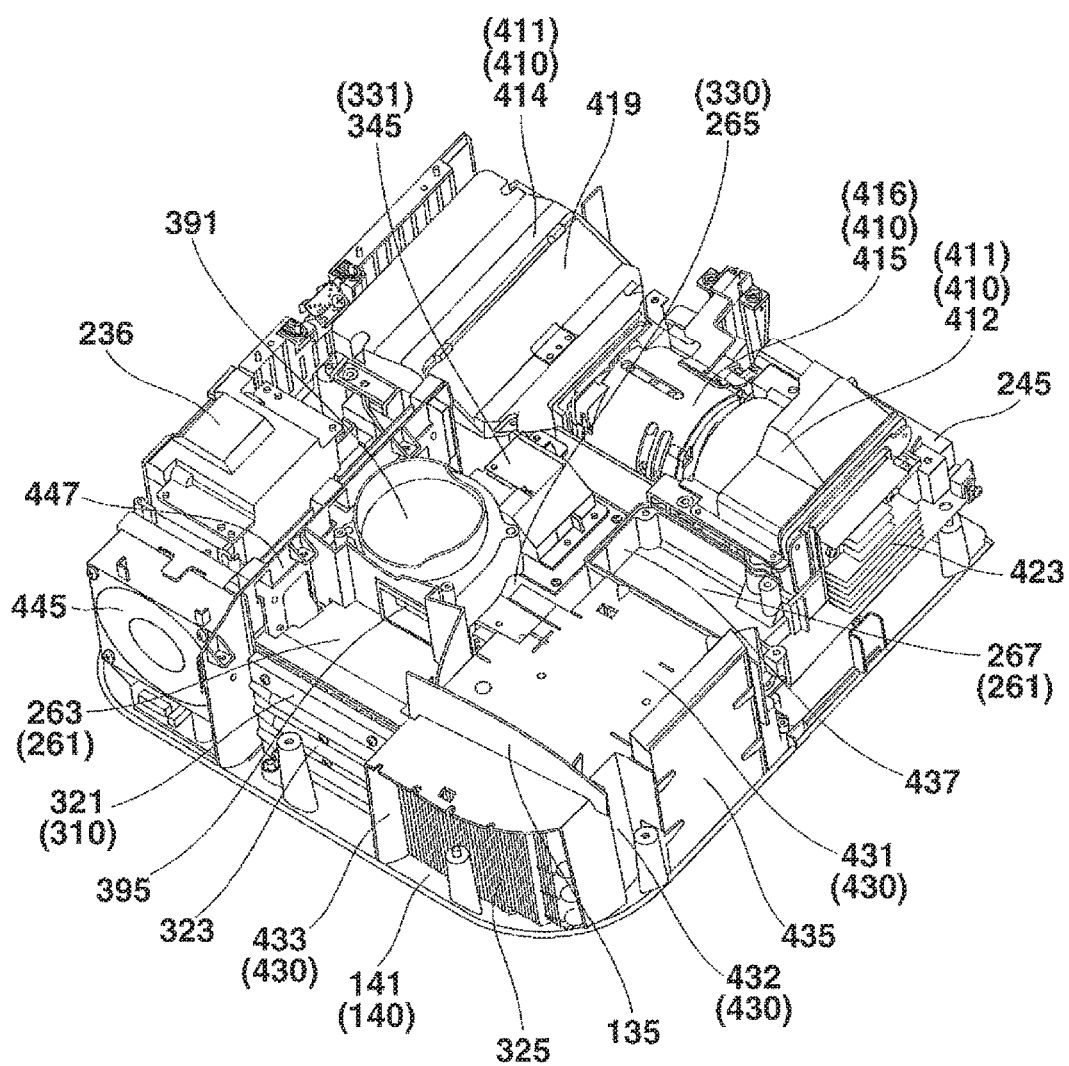
FIG. 5 is a perspective view of the projector according to the first embodiment of the invention showing a layout of a light source unit and other constituent components of the projector with an upper case thereof removed.

Next, an internal construction of the projector 100 will be described. FIG. 4 is a schematic plan view showing an internal construction surrounding an optical system of the projector 100. FIG. 5 is a perspective view of the projector 100 showing a layout of constituent members thereof. It should be noted that an upper side of the projector 100 shown in FIG. 4 is oriented obliquely downwards to the left in FIG. 5 and that a left side of the projector 100 shown in FIG. 4 is oriented obliquely downwards to the right in FIG. 5.

The projector 100, which is an image projection system, includes, as shown in FIG. 4 (a left upper corner of the bottom plate 141 shown in FIG. 4), an excitation light source heat sink 325 made up of heat dissipating fins for cooling an excitation light source, a red light source heat sink 365 made up of heat dissipating fins for cooling a red light source, a first cooling fan 327 and a second cooling fan 367 in an interior of a heat sink cover 430 which is provided in a right front corner portion of the bottom plate 141 shown in FIG. 5 (a lower corner of the bottom plate 141 shown in FIG. 5).

Then, the excitation light shining device 310, which is accommodated in the light source unit 250, is disposed at the rear of the excitation light source heat sink 325, that is, at a right end central portion of the bottom plate 141 (at a center of a left lower side of the bottom plate 141 in FIG. 5, and at an upper central portion of the bottom plate 141 in FIG. 4). As shown in FIG. 5, an excitation light source top plate portion 263 of a unit cover 261 which covers the excitation light shining device 310 is disposed lower than a cover upper plate 431 of the heat sink cover 430.

Further, a control unit cooling fan 445, which is an axial blower, is disposed at the rear of the excitation light shining device 310 (in a left corner of the bottom plate 141 shown in FIG. 5).

The luminous light emitting device 331 of the main light source module 330 is disposed substantially at a center of the bottom plate 141 with a wheel cover 345 of the luminous light emitting device 331 projecting upwards. A blower 391, which is a sirocco fan, is disposed on a right-hand side of the wheel cover 345.

Then, the blower 391 shown in FIG. 5 is mounted on an inner side of the upper panel 111 of the upper case 110 so as to be disposed closest to a position above the unit cover 261 which lies above a middle position between the excitation light shining device 310 and the wheel cover 345. An outlet port 395 of the blower 391 is oriented towards a rightward direction so that air discharged therefrom flows above the excitation light shining device 310. The blower 391 includes an outlet port partition plate 135 which extends in a front-and-rear direction.

Further, a light source-side optical device 380, which will be described later, is disposed at a center of a front side of the bottom plate 141 (a left side of the bottom plate 141 shown in FIG. 4, a right lower portion of the bottom plate 141 shown in FIG. 5) on a left-hand side of the heat sink cover 430. An optical device top plate portion 267 of the unit cover 261 which covers the light source-side optical device 380 is disposed lower than the cover upper plate 431 of the heat sink cover 430.

A projection optical system unit 410 is disposed on a left-hand side of the light source-side optical device 380 and the main light source module 330 of the light source unit 250.

This projection optical system unit 410 includes a digital micromirror device, which is abbreviated to DMD, at the front thereof as a display device 420. Lens groups of a projection optical system which are a fixed lens group and a movable lens group 416 are incorporated in a lens barrel 415 which is disposed at the rear of the display device 420, and a case rear portion 414 of a projection unit case 411 which accommodates an aspheric mirror (a rear projection mirror) is disposed at the rear of the lens barrel 415, thereby making up a proximity projection optical system.

Heat dissipating fins 423 for the display device 420 are provided at a front end of the projection optical system unit 410 which is a rear surface side of the display device 420. Image light which is reflected by the aspheric mirror is emitted obliquely to the front from the projection port 125 of the upper case 110 via a glass cover 419.

The heat sink cover 430 has a plate-shaped upper cover plate 431 which covers the excitation light source heat sink 325, the red light source heat sink 365, the first cooling fan 327 and the second cooling fan 367. A front cover wall portion 432 is provided so as to extend perpendicularly downwards from a right side of a front end of the upper cover plate 431, and a left side of the front cover wall portion 432 is opened, so that a filter 435 is provided therein.

Further, the heat sink cover 430 has a rear cover wall portion 433 at the rear of the upper cover plate 431. This rear cover wall portion 433 is provided so as to extend perpendicularly downwards from an overall length of a rear end of the upper cover plate 431 and constitutes a bulkhead.

A lower bulkhead 437 is provided at a left side of the upper cover plate 431, whereby a left side of the heat sink cover 430 is closed.

The lower bulkhead 437 has a U-like shape to cover a space above the light source-side optical device 380 and includes an air passage hole which establishes a communication between the space above the light source-side optical device 380 and a space which lies below the upper cover plate 431 to accommodate the red light source heat sink 365 and the second cooling fan 367.

As shown in FIG. 4, a plate-shaped partition plate 447 is provided at the rear (a right side in FIG. 4) of the excitation light shining device 310 and the main light source module 330 which are disposed substantially at the center of the bottom plate 141 so as to extend in the left-and-right direction (in an up-and-down direction in FIG. 4).

The speaker 236 is disposed to the left of the control unit cooling fan 445 at the rear of the partition plate 447. Various other circuit boards than a main control circuit board 441 on which the CPU and the memory are mounted and a power supply control circuit board 443 are disposed on a rear surface of the partition plate 447 and an upper surface of the bottom plate 141 of the lower case 140.

In the optical system of the projector 100, which is the image projection system, the excitation light shining device 310 is disposed on an excitation light source bottom plate portion 255 of a unit bottom plate 253 off the light source unit 250. This excitation light shining device 310 has excitation light sources, collimator lenses 313, a collective lens 315 and a diffuse plate 317.

32 blue laser oscillators or blue laser beam emitting devices, which are semiconductor light emitting devices, are disposed on a device holder 321 as excitation light sources. Laser beams emitted from the blue laser beam emitting devices are converted into substantially parallel pencils of light by collimator lenses 313 to be incident on the collective lens 315. All the laser beams that are collected by the collective lens 315 are incident on the diffuse plate 317 and are then incident on the luminescent wheel 333 while the coherency of the laser beams are reduced by the diffuse plate 371.

The main light source module 330 includes the luminescent wheel 333 which makes up part of the luminous light emitting device 331 and which is driven to rotate by a motor 341, the red light source device 350 and the light guiding optical system 370, and these constituent members are disposed on a main light source bottom plate portion 257 of the unit bottom plate 253.

Figure 6:
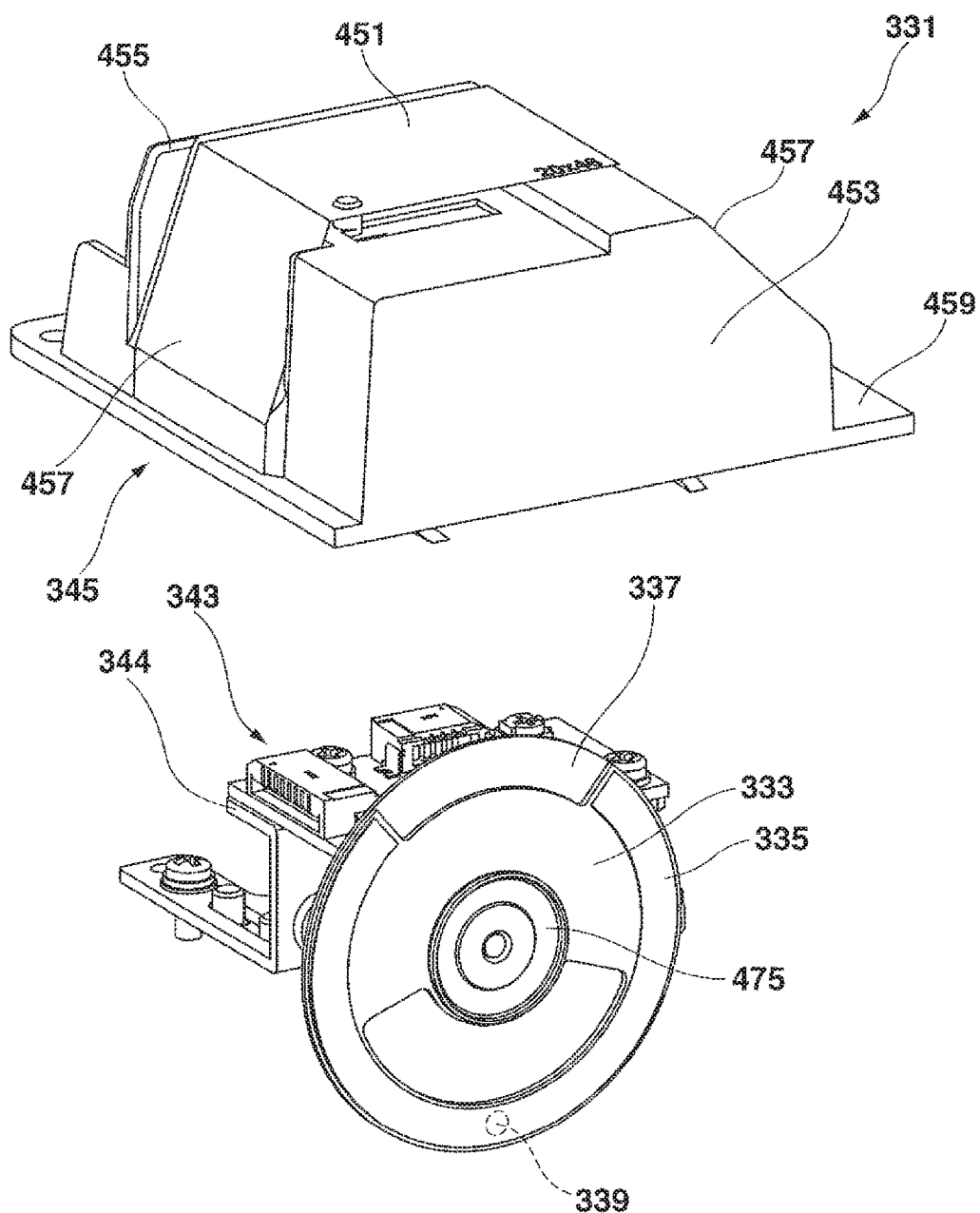
FIG. 6 is an exploded view of a luminous light emitting device according to the first embodiment of the invention.

This luminescent wheel 333 has a diffuse transmission area 337 and a luminescent material area 335 which are disposed circumferentially in an end-to-end fashion so as to form an annular shape on the same circumference (refer to FIG. 6). The diffuse transmission area 337 is formed by fitting a transparent base material having light transmitting properties such as glass in a through hole portion which is cut in a rotary plate base material which is a metallic base material of copper or aluminum. Fine irregularities are formed on a surface of the transparent base material through sandblasting. The transparent base material is a plate member which transmits light while diffusing it.

The luminescent material area 335 is formed by forming an annular groove on the surface of the rotary base material which is the metallic base material of copper or aluminum, mirror finishing a bottom portion of the groove through silver deposition and laying out a layer of a green luminescent material on the mirror finished surface.

The motor 341 is fixed to an upper surface of a main light source top plate portion 265. A rotational shaft of the luminescent wheel 333 is positioned above an axis of excitation light which passes through the collective lens 315 and the diffuse plate 317, so that the axis of excitation light becomes parallel to the rotational shaft.

The red light source device 350 is a monochrome light emitting device and includes a red light emitting diode and a collective lens group 353. The red light emitting diode, which is a semiconductor light emitting device, is disposed so that an optical axis thereof becomes parallel to the axis of excitation light which is emitted from the excitation light shining device 310. The collective lens group 353 collects light emitted from the red light emitting diode.

The light guiding optical system 370 is made up of dichroic mirrors and collective lenses. Namely, the light guiding optical system 370 is made up of a first dichroic mirror 371 which is disposed between a diffuse plate 317 of the excitation light shining device 310 and the luminescent wheel 333, a second dichroic mirror 373 which is disposed ahead of the first dichroic mirror 371 and in a position on an axis of light emitted from the red light source device 350, a reflecting mirror 377 which is disposed on a left-hand side of the luminescent wheel 333, a third dichroic mirror 375 which is disposed ahead of the reflecting mirror 377 on a left-hand side of the second dichroic mirror 373 and collective lenses 379 which are disposed between the dichroic mirrors and between the reflecting mirror 377 and the dichroic mirror.

The first dichroic mirror 371 transmits light in the blue wavelength range and reflects light in the green wavelength range. Consequently, the first dichroic mirror 371 transmits excitation light from the excitation light shining device 310 so as to be shone onto the luminescent wheel 333 and reflects luminous light emitted from the luminescent wheel 333 to the front of the projector 100.

The second dichroic mirror 373 transmits light in the red wavelength range and reflects light in the green wavelength range. Consequently, the second dichroic mirror 373 reflects light in the green wavelength range which is reflected by the first dichroic mirror 371 to be incident thereon by way of the collective lens 379 to the left and transmits light in the red wavelength range emitted from the red light source device 350 so that an axis thereof coincides with an axis of the light in the green wavelength range reflected by the second dichroic mirror 373.

The reflecting mirror 377 reflects light in the blue wavelength range which is excitation light emitted from the excitation light shining device 310 and which passes through the diffuse transmission area 337 of the luminescent wheel 333 to the front of the projector 100.

The third dichroic mirror 375 transmits light in the blue wavelength range, and reflects light in the green wavelength range and the red wavelength range. Consequently, the third dichroic mirror 375 transmits the light in the blue wavelength range from the reflecting mirror 377 and reflects the light in the red wavelength range which passes through the second dichroic mirror 373 and the light in the green wavelength range which is reflected by the second dichroic mirror 373, so that the light in the blue wavelength range, the light in the green wavelength range and the light in the red wavelength range are caused to travel to the light source-side optical device 380 provided ahead of the third dichroic mirror 375 while causing axes of the blue, green and red lights to coincide with one another.

This light source-side optical device 380 guides the light source lights to the display device 420 of the projection optical system 410 while distributing intensities of the light source lights uniformly and is made up of collective lenses 381, 385, a light tunnel 383 and a light axis turning mirror 387 which are disposed on an optical device bottom plate portion 259 of the unit bottom plate 253 of the light source unit 250.

In the light source-side optical device 380, the light source lights which travel byway of the third dichroic mirror 375 of the main light source module 330 are collected by the collective lens 381 to be incident on the light tunnel 383, where the intensities of the light source lights are distributed uniformly. Further, the lights which exit from the light tunnel 383 where their intensities are distributed uniformly are collected by the collective lens 385 to be shone onto the light axis turning mirror 387. Then, the lights which are reflected by the light axis turning mirror 387 are caused to be incident on the projection optical system unit 410.

The light axis turning mirror 387 turns the axes of the lights which exit from the light tunnel 383 through 90 degrees to the left so that the lights are reflected obliquely upwards at an angle of 45 degrees in parallel to the display device 420 and the front panel 113.

In this way, the light source lights whose traveling directions are turned by the light axis turning mirror 387 travels in parallel to an incident surface of the display device 420 to be incident on a TIR prism 389 which is disposed closest to a front surface of the display device 420 and are then shone onto an image forming surface of the display device 420. Due to this, a front end of the light source-side optical device 380 and a front end of the projection optical system unit 410 can be aligned with each other by disposing the light axis turning mirror 387 closest to the display device 420 and the TIR prism 389.

The projection optical system unit 410 has the TIR prism 389 which is disposed closest to the front surface of the display device 420, and when the lights from the light axis turning mirror 387 are incident on the TIR prism 389, the incident lights are shone onto the display device 420. Then, image light which is formed by the display device 420 is shone onto the aspheric mirror 417 which is situated in a rear position in the projector 100 by way of the fixed lens group and the movable lens group 416 which are incorporated in the lens barrel 415 which is situated further rearwards than the display device 420 in the projector 100.

The image light which is reflected by the aspheric mirror 417 is emitted from the projection optical system unit 410 by way of the glass cover 419 which is attached to the projection unit case 411 and then passes through the projection port 125 in the upper case 110 which is disposed closest to the glass cover 419 via a cushion material 127 to thereby be projected onto a screen.

The light source unit 250 which includes the excitation light shining device 310 which includes the excitation light sources and the luminous light emitting device 331, the red light source device 350 which includes the red light source, and the light guiding optical system 370 and the light source-side optical device 380 is accommodated in a light source unit case 251 which includes the wheel cover 345.

In addition, the projection optical system unit 410 which includes the TIR prism 389, the display device 420, the lens groups of the projection optical system and the aspheric mirror 417 is also accommodated in the projection unit case 411.

The light source unit case 251 is made up of the unit bottom plate 253 formed of a heat-resistant resin, the unit cover 261 formed of a light metal alloy having good thermal conductivity such as a magnesium alloy and the wheel cover 345.

The wheel cover 345 of the luminous light emitting device 331 which is made up of the luminescent wheel 333, the motor 341 and the wheel cover 345 is fixed to the main light source top plate portion 265 of the unit cover 261. The motor 341 which is fixed to the upper surface of the main light source top plate portion 265 of the unit cover 261, a wheel control circuit board 343 and part (more than an upper half portion) of the luminescent wheel 333 are accommodated in the wheel cover 345.

The luminescent wheel 333 is disposed so that a lower part thereof intersects an optical path of light in the blue wavelength range which is excitation light emitted from the excitation light shining device 310. Most of the luminescent wheel 333 is situated above the main light source module 330 and is covered by the wheel cover 345.

As shown in FIG. 6, this wheel cover 345 has a top cover plate 451 having a flat plate-like shape and which covers the motor 341, the wheel control circuit 343 and the upper portion of the luminescent wheel 333, a front cover plate 453 which extends downwards from an end portion of the top cover plate 451 to cover part (more than a half) of a front surface of the luminescent wheel 333 where the luminescent material area 335 is provided, two side cover plates 457 which extend downwards from the other end portion of the top cover plate 451 and a rear cover plate 455 which covers the motor 341 and the like together with the two side cover plates 457 and the top cover plate 451.

The two side cover plates 457 are connected individually to two facing side portions of the top cover plate 451 so that end portions of the front cover plate 453 and the rear cover plate 455 which are connected to two facing end portions of the top cover plate 451 so as to be substantially parallel to each other are connected together by the two side cover plates 457, whereby a space is defined on an inner surface side of the top cover plate 451 by the front cover plate 453, the rear cover plate 455 and the two side cover plates 457, so that the motor 341, the wheel control circuit board 343 and the part (more than a half) of the luminescent wheel 333 can be accommodated in the space so defined.

A fixing flange portion 459 is provided along lower ends of the rear cover plate 455 and the side cover plates 457 so as to extend outwards therefrom, so that the wheel cover 345 can be attached to the main light source top plate portion 265.

Figure 7:
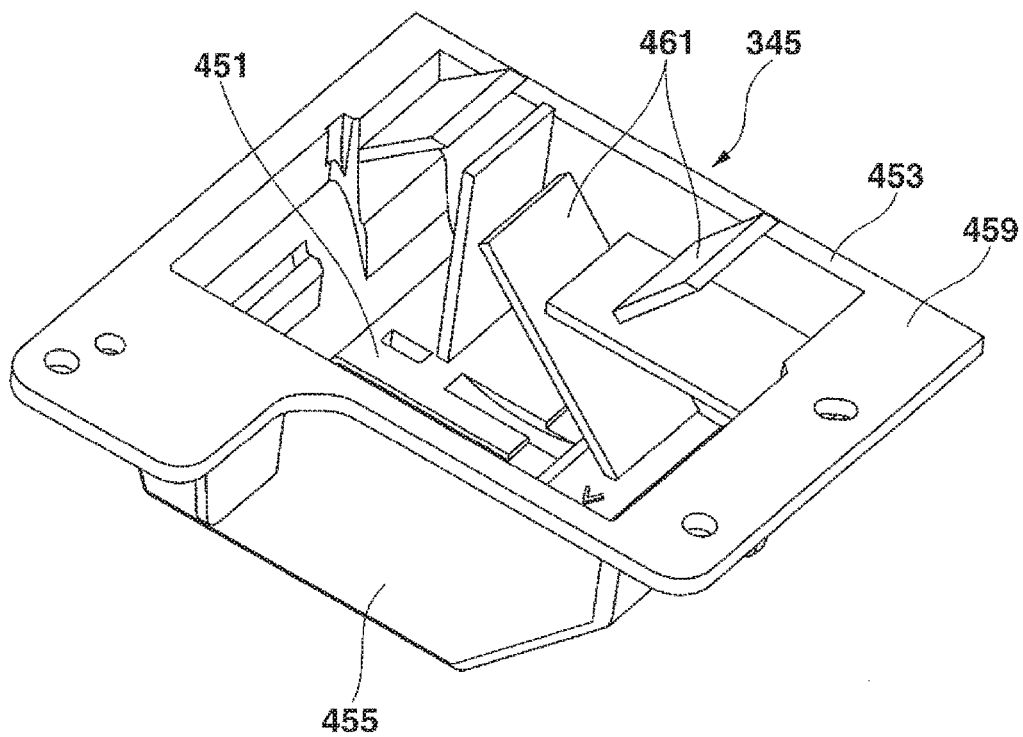
FIG. 7 is a perspective view showing an interior of a wheel cover of the luminous light emitting device according to the first embodiment of the invention.
Figure 8:
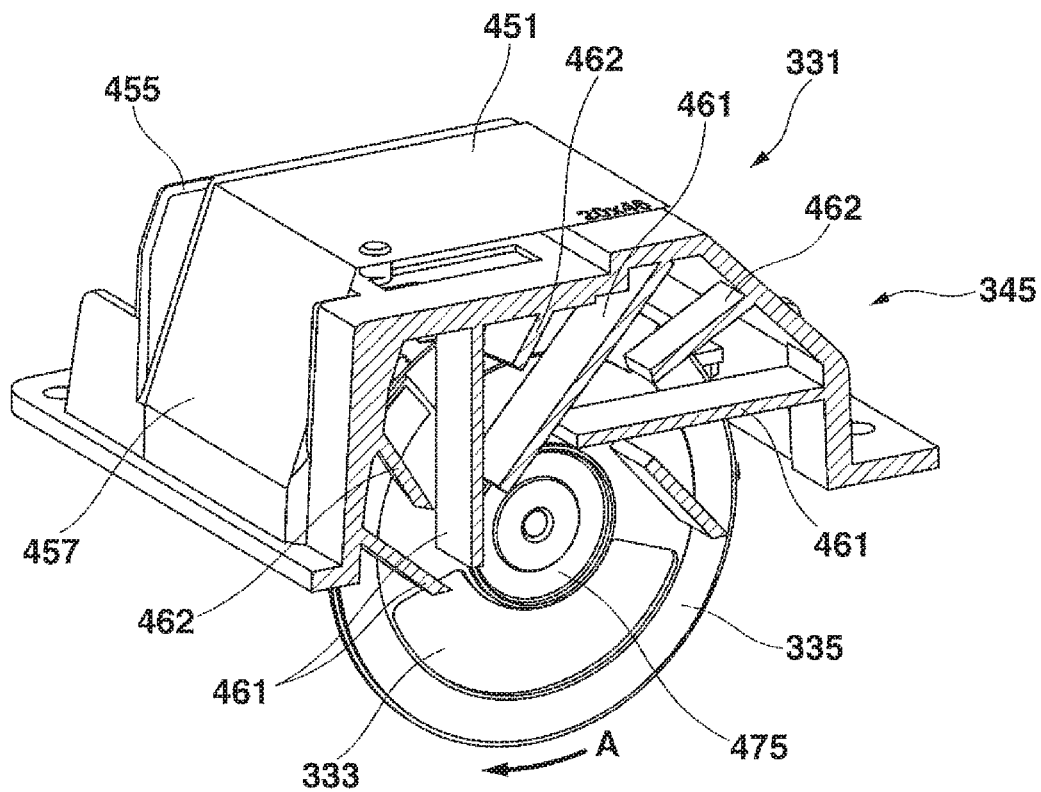
FIG. 8 is a partially sectional perspective view showing schematically a construction of the luminous light emitting device according to the first embodiment of the invention.

Further, as shown in FIGS. 7 and 8, the wheel cover 345 has a plurality of plate-shaped internal heat dissipating plates 461 on an inner side of the front cover plate 453. These internal heat dissipating plates 461 are disposed so as to form a spiral shape about the vicinity of a center of the luminescent wheel 333 in a circumferential direction thereof while each extending from the vicinity of the center towards an outer circumference of the luminescent wheel 333.

Namely, the plurality of internal heat dissipating plates 461 are disposed so as to intersect obliquely radial directions of the luminescent wheel 333 which pass through the center of the luminescent wheel 333 from a central portion of the luminescent wheel 333 towards the outer circumference of the luminescent wheel 333 while avoiding a wheel fixing portion 334 which is formed at the center of the luminescent wheel 333 for fixing the luminescent wheel 333 to the rotational shaft of the motor 341.

With inner end portions of the internal heat dissipating plates 461 positioned forwards of a closest vicinity of a circumferential edge of the wheel fixing portion 334 along a rotational direction A of the luminescent wheel 333, the internal heat dissipating plates 461 are disposed sequentially along the rotational direction A of the luminescent wheel 333 while extending towards the outer circumference of the luminescent wheel 333 to extend beyond a circumcircle of the luminescent wheel 333 to thereby be connected to an inner surface of the front cover plate 453. Thus, the internal heat dissipating plates 461 are provided on the inner surface of the front cover plate 453 in the way described above.

Figure 11:
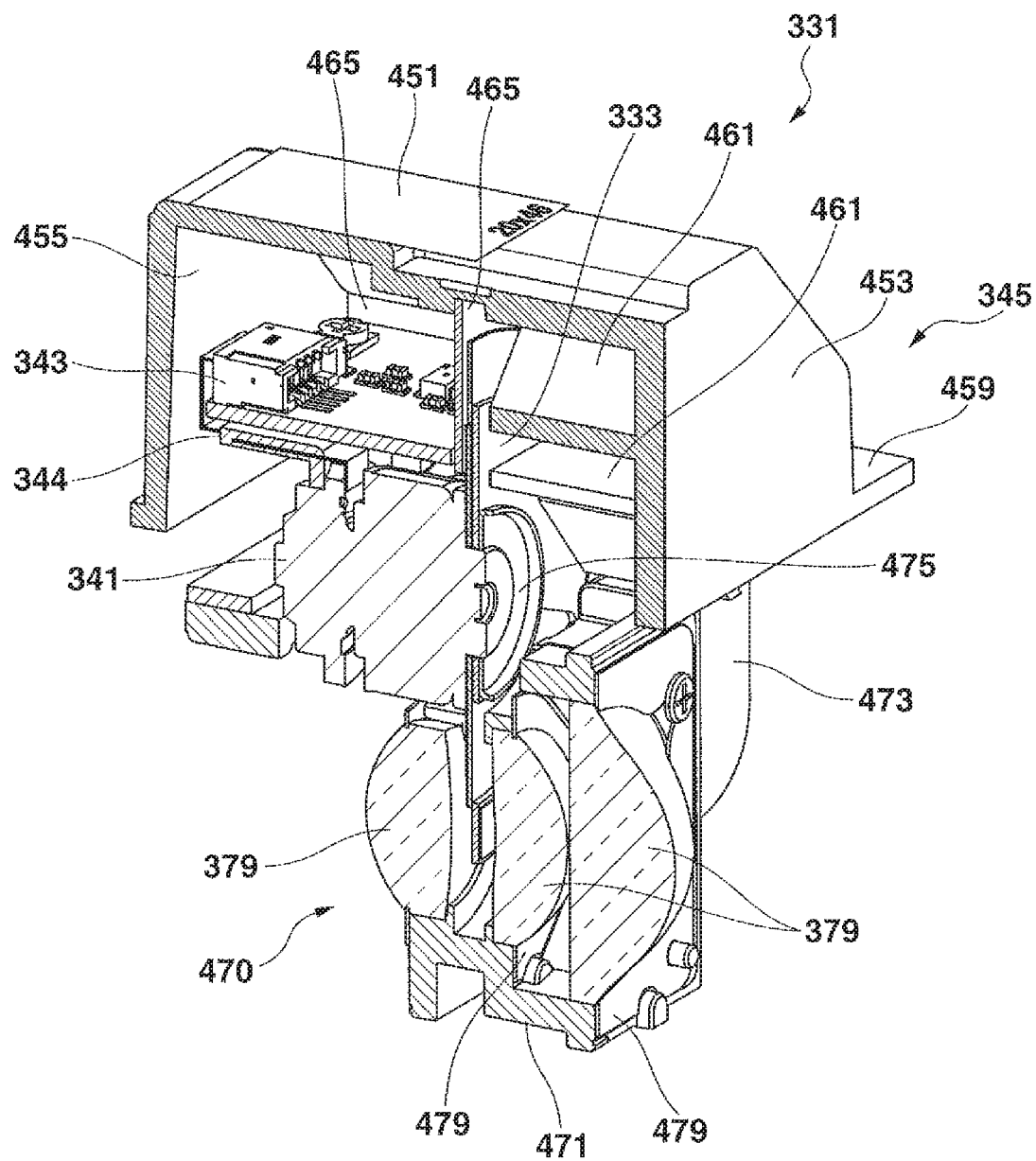
FIG. 11 is a partially sectional perspective view of the luminous light emitting device of the modified example according to the first embodiment of the invention.
Figure 12:
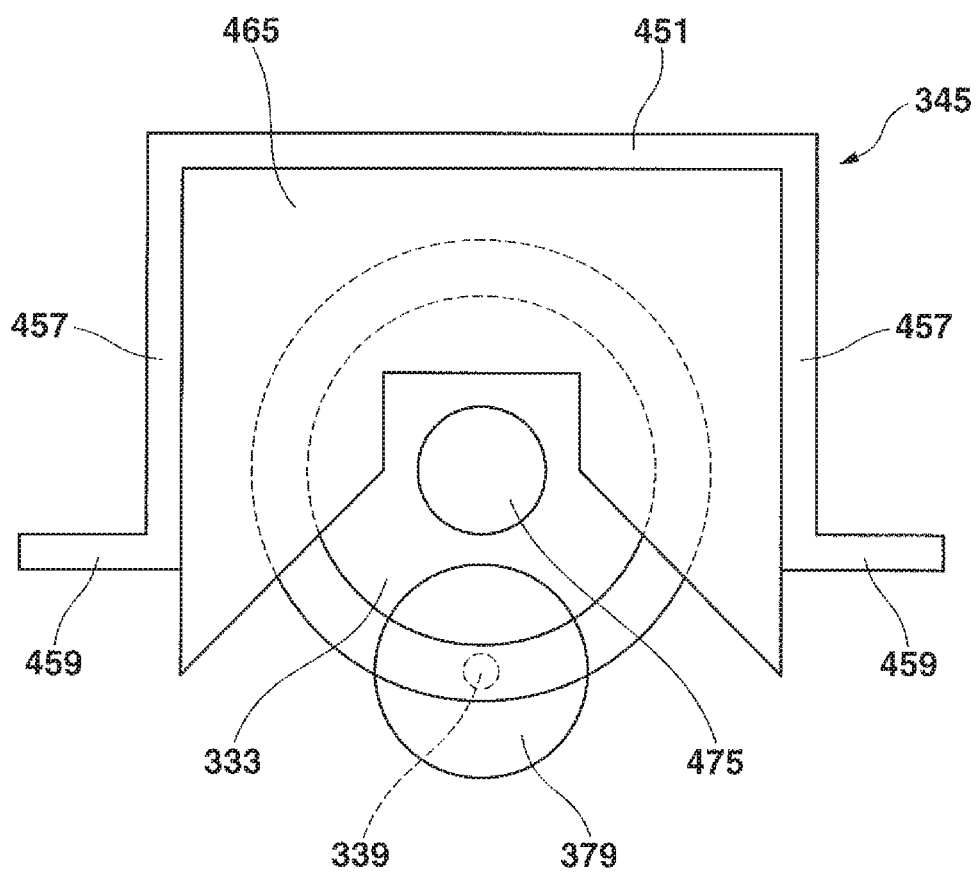
FIG. 12 is a schematic view showing an auxiliary heat dissipating plate of the luminous light emitting device according to the first embodiment of the invention.

The internal heat dissipating plates 461 each have a plate shape having a width over which the internal heat dissipating plate 461 extends in a widthwise direction from the inner surface of the front cover plate 453 to a position lying closest to the surface of the luminescent wheel 333 where the luminescent material area 335 is provided (refer to FIG. 11). When air staying near the surface of the luminescent wheel 333 moves in the rotational direction as the luminescent wheel 333 rotates, the internal heat dissipating plates 461 move the air which is moving in the rotational direction in such a way as to guide the air from the center towards the outer circumference of the luminescent wheel 333 in association with the rotation of the luminescent wheel 333.

Thus, air staying near the front surface of the luminescent wheel 333 which includes the annular luminescent material area 335 which is sequentially positioned on a shining or illumination spot 339 to be heated to high temperatures is circulated so as to be moved from a central portion to a circumferential edge portion of the luminescent wheel 333 within the wheel cover 345, thereby making it possible to enhance the heat dissipating effect of the luminescent wheel 333.

The inner end portions of the plurality of internal heat dissipating plates 461 are positioned equidistant from the rotational center of the luminescent wheel 333. However, the positions of the inner end portions of the internal heat dissipating plates 461 are not limited to the positions where the inner end portions are situated equidistant from the rotational center of the luminescent wheel 333. Hence, there is a situation where internal heat dissipating plates 462 are provided whose lengths from the central portion towards the outer circumference of the luminescent wheel 333 are shortened.

When the plurality of internal heat dissipating plates 461 are disposed so as to extend radially along the radial directions of the luminescent wheel 333 from the central portion towards the outer circumference of the luminescent wheel 333, distances between the adjacent internal heat dissipating plates 461 become greater at the outer circumference than at the central portion of the luminescent wheel 333. Thus, the shorter internal heat dissipating plates 462, whose inner end portions are positioned farther away from the rotational center of the luminescent wheel 333 than the inner end portions of the internal heat dissipating plates 461 which are positioned equidistant from the rotational center of the luminescent wheel 333, are disposed between outer circumferential ends of the internal heat dissipating plates 461.

Figure 9:
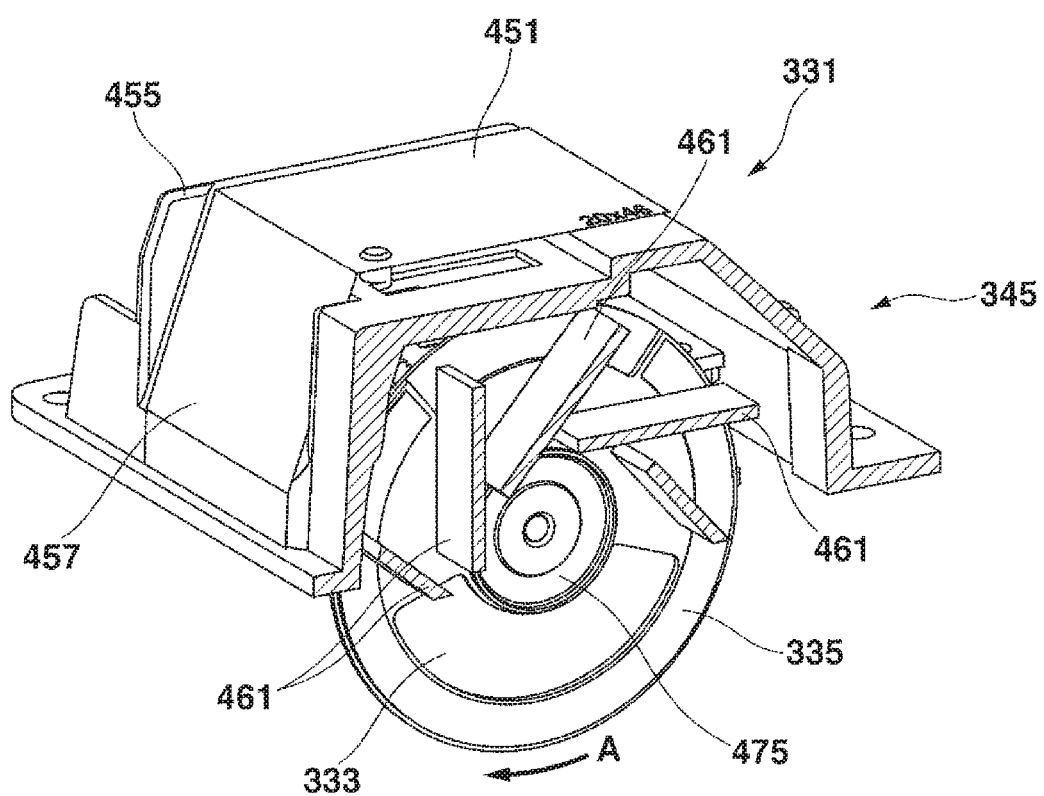
FIG. 9 is a partially sectional perspective view showing schematically another construction of the luminous light emitting device according to the first embodiment of the invention.

Further, as shown in FIG. 9, a configuration may be adopted in which outer circumferential ends of internal heat dissipating plates 461 which are long from central ends to the outer circumferential ends are not connected to the wheel cover 345. Namely, sides of the internal heat dissipating plates 461 are connected to the front cover plate 453, while gaps are provided between the outer circumferential ends of the internal heat dissipating plates 461 and the top cover plate 451 and the side cover plate 457. Consequently, in comparison with the internal heat dissipating plates 461 shown in FIG. 8, the outer circumferential ends of the internal heat dissipating plates 461 shown in FIG. 9 are cut shorter so as to be spaced away from the top cover plate 451 and the side cover plate 457. This configuration allows air to flow to be circulated easily at the outer circumferential ends of the internal heat dissipating plates 461, thereby facilitating the dissipation of heat.

The plurality of internal heat dissipating pates 461 may be configured so as to become gradually thicker from the central ends towards the outer circumferential ends thereof as the internal heat dissipating plates 461 extend radially along the radial directions of the luminescent wheel 333 from the central portion towards the outer circumference thereof. By gradually increasing the thickness of the internal heat dissipating plates 461 from the central ends towards the outer circumferential ends thereof as they extend from the central portion towards the outer circumference of the luminescent wheel 333 in the way described above, heat can efficiently conducted from the central ends of the internal heat dissipating plates 461 where they are thin towards the outer circumferential ends thereof where they are thick, thereby facilitating the dissipation of heat.

There may be a case where the plurality of internal heat dissipating plates 461 are disposed so as to extend radially along the radial directions of the luminescent wheel 333 from the center or the central portion of the luminescent wheel 333 which surrounds the center towards the outer circumference thereof.

Although the plurality of internal heat dissipating plates 461 each take the form of the flat plate which extends from the central portion towards the outer circumference of the luminescent wheel 333 while kept parallel to a rotational shaft of the luminescent wheel 333 which is positioned at the center thereof, the invention is not limited thereto. The internal heat dissipating plates 461 may each take the form of a flat plate which extends from the central portion towards the outer circumference while being inclined relative to the rotational shaft in a twisted fashion.

The wheel cover 345 and the internal heat dissipating plates 461 are formed of a metal having good heat conductivity (a well conductive metal) such as aluminum or copper or a well heat conductive resin having high heat conductivity (a high heat conductive resin) such as polyphenylene sulfide (PPS), whereby heat of the luminescent wheel 333 or heat of air staying on the periphery of the luminescent wheel 333 can be dissipated to air staying outside of the wheel cover 345 via the wheel cover 345.

In this way, with the luminous light emitting device 331 which includes the wheel cover 345 which covers the motor 341, the wheel control circuit board 343 and the part (more than a half) of the luminescent wheel 333 and which has the plurality of internal heat dissipating plates 461 which are provided on the inner surface of the wheel cover 345 so as to extend from the inner surface of the wheel cover 345 to the close vicinity of the surface of the luminescent wheel 333 where the luminescent material area 335 is formed, it is possible to prevent easily the luminescent wheel 333 from being heated to high temperatures by enhancing the heat dissipating effect of the luminescent wheel 333.

Consequently, by combining the luminous light emitting device 331 and the excitation light shining device 310 together, it is possible to provide the light source unit which can emit highly bright luminous light by preventing the luminescent wheel 333 from being heated to high temperatures and maintaining high the luminous efficiency at which luminous light is emitted from the luminescent wheel 333.

The sirocco fan-type blower 391 which is mounted on the inner side of the upper panel 111 of the upper case 110 has an inlet port 393 in a center of a lower surface and is fixed to the inner side of the upper panel 111 of the upper case 110 in such a way as to be suspended above the main light source module 330 on the right-hand side of the wheel cover 345.

The blower 391 which is disposed above the light source unit 250 takes in air staying near the unit cover 261 of the light source unit 250 and discharges the air in such a way as to be jetted out from the central inside air outlet holes 183 in the right panel 119 to the right along an upper surface of the excitation light shining device 310.

Consequently, by using the construction described above, air is passed through the close vicinity of the excitation light shining device 310 which produces heat much to the outside of the projector 100 while the main light source module 330 in which the optical members such as the lenses and the dichroic mirrors which perform optical operations of refraction transmitting or reflecting highly bright light which is shone thereon and the luminous light emitting device 331 are disposed is cooled by the blower 391, thereby making it possible to cool part of the excitation light shining device 310.

In the luminescent wheel 333 onto which laser beams are shone as excitation light, the motor 341 and the rotational shaft are disposed above the unit cover 261 of the light source unit 250, and a great wheel diameter is given to the luminescent wheel 333. This not only mitigates the deterioration and fatigue of the luminescent material which would otherwise be caused as a result of excitation light being shone to the luminescent wheel 333 but also enhances the heat dissipating effect. In addition, the blower 391 takes in warm air staying on the periphery of the wheel cover 345 to thereby cool effectively not only the wheel cover 345 but also the luminous light emitting device 331 and the main light source module 330.

As outside air which is taken in from the front outside air inlet holes 161, outside air which passes through the filter 435 which is situated lower than the heat sink cover 430 is taken into an interior of the heat sink cover 430 by the first cooling fan 327 and is then blown against the excitation light source heat sink 325, too, together with outside air which is blown against the red light source heat sink 365 by way of the air passage hole. Then, the air blown against the heat sinks is discharged from the front inside air outlet holes 181 in the right panel 119 to the outside of the projector 100 to thereby cool the excitation light source and the red light source effectively.

The control unit cooling fan 445 takes in air inside the projector casing to discharge the air from the rear inside air outlet holes 185 in the right panel 119. However, since the space where to accommodate the light source unit 250 and the space defined at the rear of the light source unit 250 are divided by the partition plate 447, the circuit board and the like which are disposed near the back panel 115 in the projector casing are cooled by outside air which is taken into the casing of the projector 100 from the rear outside air inlet holes 167 which are provided in the back panel 15 and the rear side outside air inlet holes 165 which are provided in the left panel 117. Then, the control unit cooling fan 445 discharges the air to the outside of the projector 100.

In this way, in the first embodiment, the light source unit which can emit lights of the three primary colors along the same optical path by the excitation light shining device 310, the optical paths of lights in the blue wavelength range which are emitted from the excitation light shining device 310 and the lenses, the diffuse plate 317 and the mirrors which are disposed along the optical paths, the optical path of light in the green wavelength range which is emitted from the luminescent wheel 333 of the luminous light emitting device 331 and the lenses and the dichroic mirror which are disposed along the optical path, the red light source device 350 utilizing the semiconductor light emitting device, the optical path of light in the red wavelength range which is emitted from the red light source device 350 and the lenses and the dichroic mirror which are disposed along the optical path, and the light source-side optical device 380 which guides the lights of the three primary colors which are emitted from the light source unit to the TIR prism 389 lying in the close vicinity of the display device 420 are covered by the unit cover 261.

Consequently, in this projector 100, since the passageways of the light source lights are tightly closed within the casing, dust in the atmosphere is prevented from intruding into the casing, whereby the optical members are prevented from getting dirty. Thus, the heat sources can be cooled while preventing the reduction in function of the optical members which would otherwise be caused with time. Consequently, it is possible to provide the light source unit which can emit bright light source lights of the three primary colors for a long period of time, whereby it is possible to provide the projector 100 which can project a bright and clear image.

In the event that the passageways of light source lights are not tightly closed, allowing part of cooling air which is taken into the projector 100 from the outside to intrude the spaces which make up the passageways of light source lights, there may be a situation where not only is part (more than a half) of the luminescent wheel 333 covered by the wheel cover 345 in the way described above, but also the whole of the luminescent wheel 333 is covered by the wheel cover 345. As this occurs, as shown in FIG. 10, a lens holding member 470 is added which covers the other part (substantially a lower half portion) of the luminescent wheel 333 which is different from the part thereof.

The lens holding member 470 is disposed on a lower surface of the main light source top plate portion 265, whereby the motor 341, the wheel control circuit board 343 and the luminescent wheel 333 are accommodated in such a way as to be covered entirely by the wheel cover 345 and the lens holding member 470, whereby the luminous light emitting device 331 can include the luminescent wheel 333 which is constructed so as to be tightly closed.

Figure 10:
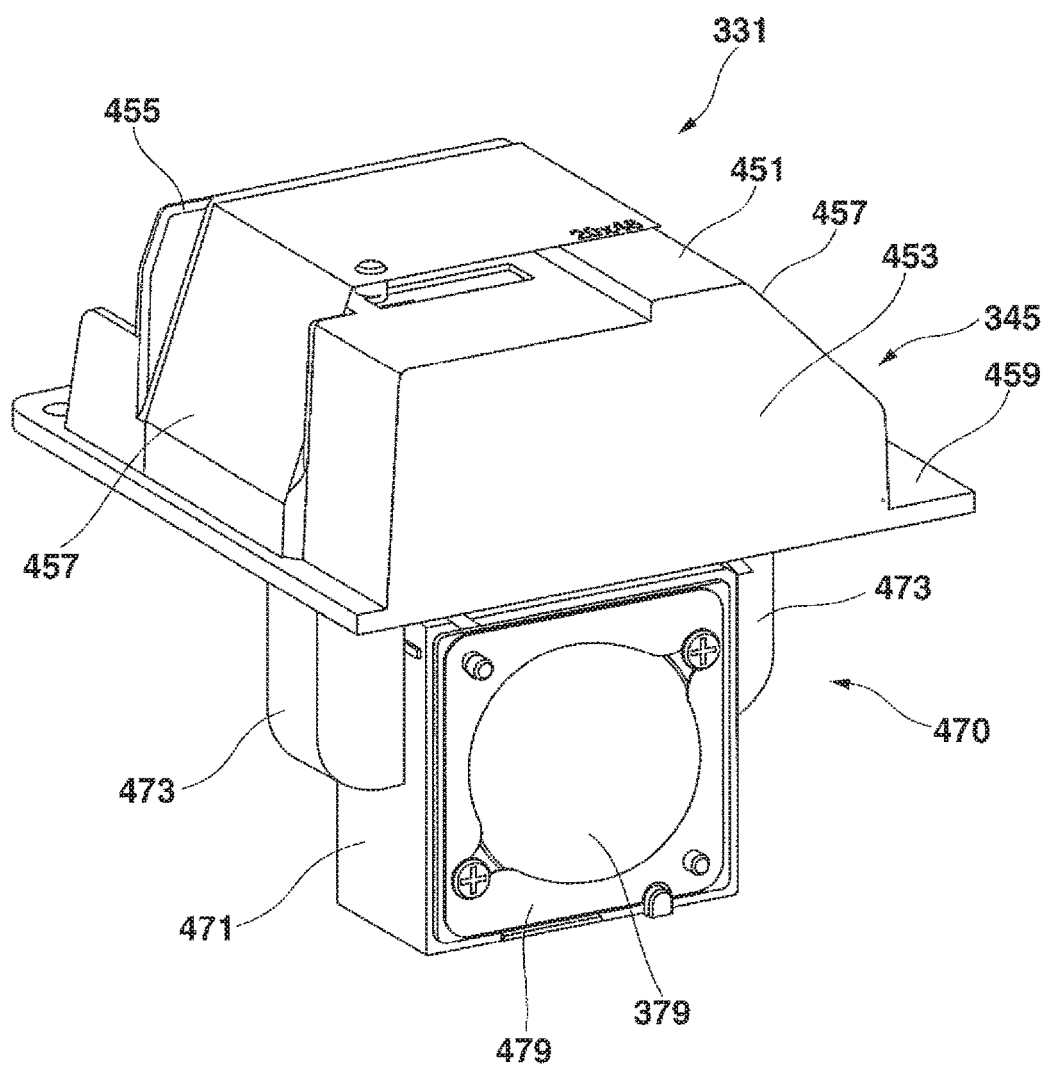
FIG. 10 is a perspective view showing a luminous light emitting device of a modified example made according to the first embodiment of the invention.

As shown in FIGS. 10 and 11, the lens holding member 470 accommodates substantially the lower half of the luminescent wheel 333 with the collective lenses 379 disposed ahead of and behind the luminescent wheel 333. Excitation light is collected by the collective lens 379 which is disposed ahead of the luminescent wheel 333 to be shone onto the illumination spot 339.

The lens holder 470 is fixed to the lower surface of the main light source top plate portion 265 and has a frame-shaped lens fixing frame 471. The lens holder 470 also has lens fastening plates 479 with which the collective lenses 379 which are inserted substantially into a center of the lens fixing frame 471 are fixed to the lens fixing frame 471. Wheel cover portions 473 which cover a circumferential edge portion of the luminescent wheel 333 are provided at upper portions on both sides of the lens fixing frame 470 so as to project to the left and right, respectively, so as to accommodate not only the collective lenses 379 which are fixed to the lens fixing frame 471 but also the substantially lower half of the luminescent wheel 333 which projects from the main light source top plate portion 265 into the main light source module 330.

The lens holding member 470 has a motor fixing portion 475 which projects sideways from an upper end of the lens fixing frame 471 to fix the motor 341 in place so that the lens holding member 470 and the motor 341 are integrated with each other, whereby the lens holding member 470 and the motor 341 are both fixed to the main light source top plate portion 265.

A wheel control circuit board support portion 344 is provided on the motor fixing portion 475, whereby a wheel control circuit board 343 which functions as the wheel control unit 234 for controlling the rotation of the motor 341 is fixed to the lens holding member 470 together with the motor 341.

Consequently, in the luminous light emitting device 331 shown in FIG. 11, the motor 341 and the luminescent wheel 333 are accommodated in the closed space by the wheel cover 345 which is fixed to the upper surface of the main light source top plate portion 265 to cover the motor 341 and the luminescent wheel 333, the lens fixing member 470 which is fixed to the main light source top plate 265 while being integrated with the motor 341 to cover the portion of the luminescent wheel 333 which projects into the main light source module 330 and the collective lenses 379 which are fixed to the lens holding member 470.

In this way, with the luminous light emitting device 331 in which the luminescent wheel 333 and the motor 341 are accommodated in the closed space, it is possible to prevent the increase in temperature of the luminescent wheel 333 by circulating air within the closed space by the internal heat dissipating plates 461 which are disposed in the close vicinity of the surface of the luminescent wheel 333 where the luminescent material area 335 is formed while preventing the luminescent wheel 333 from getting dirty by dust in air adhering thereto.

In the luminous light emitting device 331 shown in FIG. 11, the wheel cover 345 is fixed to the main light source top plate portion 265 of the unit cover 261 of the light source unit 251, and the lens holding member 470 is also fixed to the main light source top plate portion 265, so that the wheel cover 345 and the lens holding member 470 are integrated with each other via the main light source top plate portion 265. However, there may be a situation where the luminous light emitting device 331 which incorporates the motor 341 and the luminescent wheel 333 is mounted on the main light source top plate portion 265 by connecting the upper ends of the lens fixing frame 471 of the lens holding member 470 and the circumferential edge portion of the motor fixing portion 475 directly to the lower ends of the front cover plate 453, the rear cover plate 455 and the side cover plates 457 so that the wheel cover 345 is integrated with the lens holding member 470.

In the luminous light emitting device 331 which accommodates the motor 341 and the luminescent wheel 333 by integrating the wheel cover 345 with the lens holding member 470 with or without the main light source top plate portion 265 being interposed therebetween, the internal space where to accommodate the motor 341 and the luminescent wheel 333 is configured as the closed space. However, the invention is not limited thereto, and hence, a configuration may be adopted in which gaps or slits are formed in part of the motor fixing portion 475 or the wheel cover portions 473 to make the closed space air-permeable.

With the luminous light emitting device 331 in which the luminescent wheel 333 and the motor 341 are accommodated in the interior thereof by the wheel cover 345 and the lens holding member 470 in the way described above, it is easy to handle the luminous light emitting device 331. In addition, the luminous light emitting device 331 can be combined with the excitation light shining device 310 to provide the light source unit which can emit highly bright light source lights over a long period of time.

In this luminous light emitting device 331, there may be adopted a configuration in which not only are a plurality of internal heat dissipating plates 461 provided so as to lie close to the surface of the luminescent wheel 333 where the luminescent material area 335 is formed but also auxiliary heat dissipating plates 465 are provided closest to a surface of the luminescent wheel 333 where no luminescent material area 335 is provided (refer to FIG. 11).

These auxiliary heat dissipating plates 465 are well heat conductive thin metallic plates and are fixed to the top cover plate 451 and the side cover plates 457 along circumferential edge portions thereof. The auxiliary heat dissipating plates 465 each have a shape in which left and right side portions extend downwards along the slides of the luminescent wheel 333 so as to avoid the portions of the luminescent wheel 333 where the motor fixing portion 475 or the motor 341 and the collective lenses 479 are provided. The auxiliary heat dissipating plates 465 are made parallel to the rear surface of the luminescent wheel 333 where the luminescent material area 335 is not provided and is disposed so as to lie closest to the rear surface of the luminescent wheel 333.

Consequently, radiant heat from the luminescent wheel 333 and heat of air staying closest to the luminescent wheel 333 are conducted to the wheel cover 345 by the auxiliary heat dissipating plates 465 so as to be dissipated from the wheel cover 345, whereby it is possible to suppress the increase in temperature of the luminescent wheel 333. The auxiliary heat dissipating plates 465 which are situated on the rear surface side of the luminescent wheel 333 also function as bulkheads which allow air to flow without being diffused.

The wheel covers 345 shown in FIGS. 8 and 11 are made to cover not only the luminescent wheel 333 but also the motor 341 and the wheel control circuit board 343. However, it should be good enough in case the wheel control circuit board 343 is fixed to an exterior portion of the wheel cover 345, a rear half of the motor 341 is also exposed to an exterior portion of the wheel cover 345 from the rear cover plate 455 of the wheel cover 345, a front portion of the motor 341 where the luminescent wheel 333 is fixed to the motor 341 and the luminescent wheel 333 are accommodated in the interior of the wheel cover 345, and at least the upper half portion of the luminescent wheel 333, which is the part of the luminescent wheel 333, is covered by the wheel cover 345.

In the luminous light emitting device 331 according to the first embodiment which is shown in FIG. 10 or the like, the motor 341 which rotates the luminescent wheel 333 is disposed upper than the illumination spot 339, that is, the axis of excitation light. However, there may be a situation where the motor 341 is disposed horizontally coaxial with the axis of excitation light.

[Second Embodiment]

Figure 13:
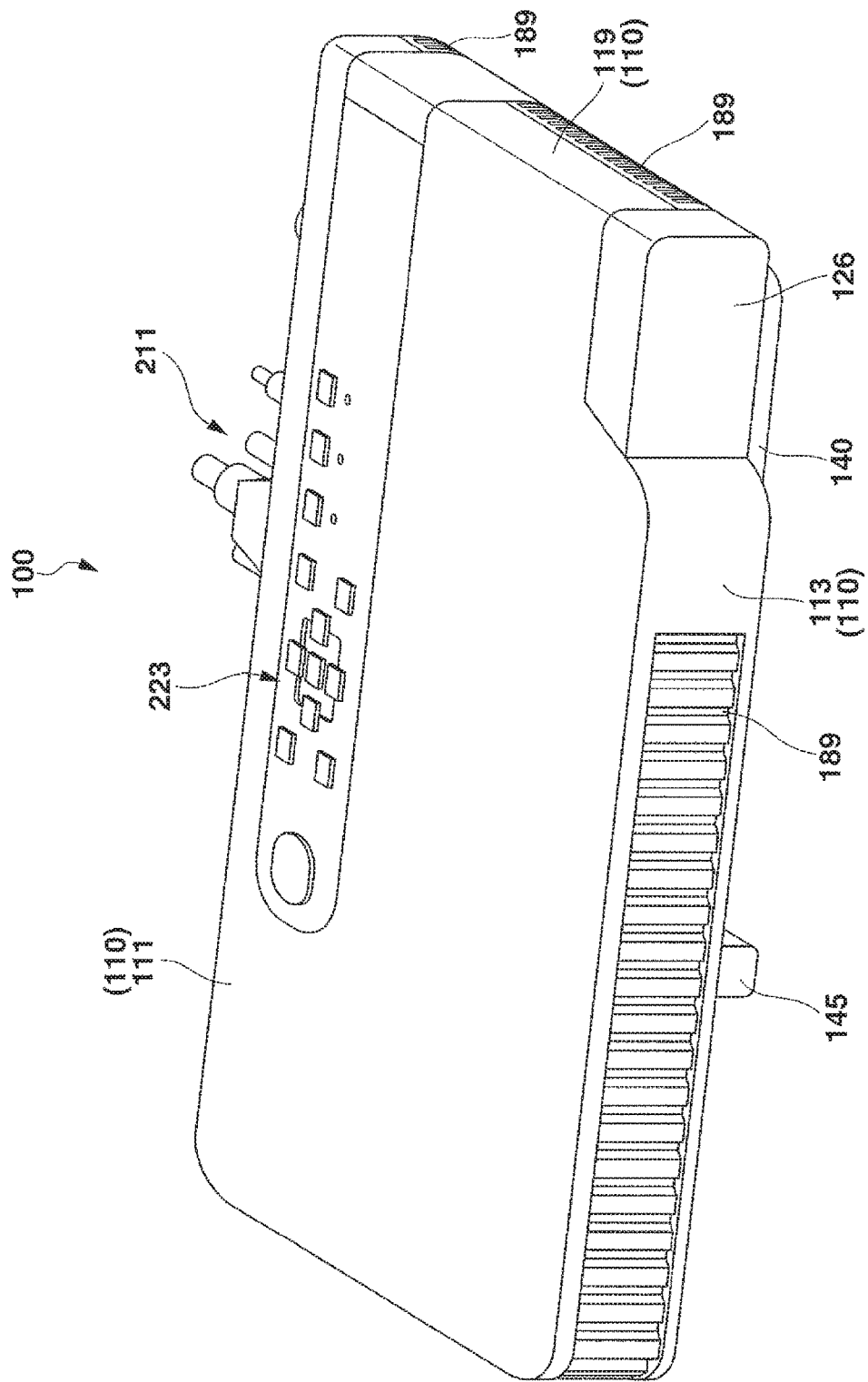
FIG. 13 is an external perspective view of a projector according to a second embodiment of the invention.

The luminous light emitting device 331 in which the motor 341 is disposed horizontally coaxial with the axis of excitation light is such as to be incorporated in a thin projector 100 which is shown in FIG. 13.

Similar to the projector 100 shown in FIGS. 1 and 2, this projector 100, which is a thin image projection system, is configured as a projector 100 in which optical devices and circuit boards are fixed to a lower case 140, and the optical devices are covered by an upper case 110. Then, inlet and outlet holes 189 are provided in a front panel 113 of the upper case 110, and a projection port cover 126 is provided in a position at a left end portion of the front panel 113. When projecting an image onto a screen, the projection part cover 126 is removed.

A keys/indicators unit 223 is provided on an upper surface of the upper case 110, and an input/output connector unit 211 including (groups of) various terminals is provided on a back panel 115 of the upper case 110. A plurality of inlet and outlet holes 189 are also provided in a right panel 119 of the upper case 110.

Legs 145 including height adjustable threaded portions are attached to the lower case 140. Thus, the projector 100 has similar functions and handling operations to those of the projector 100 shown in FIG. 1.

Figure 14:
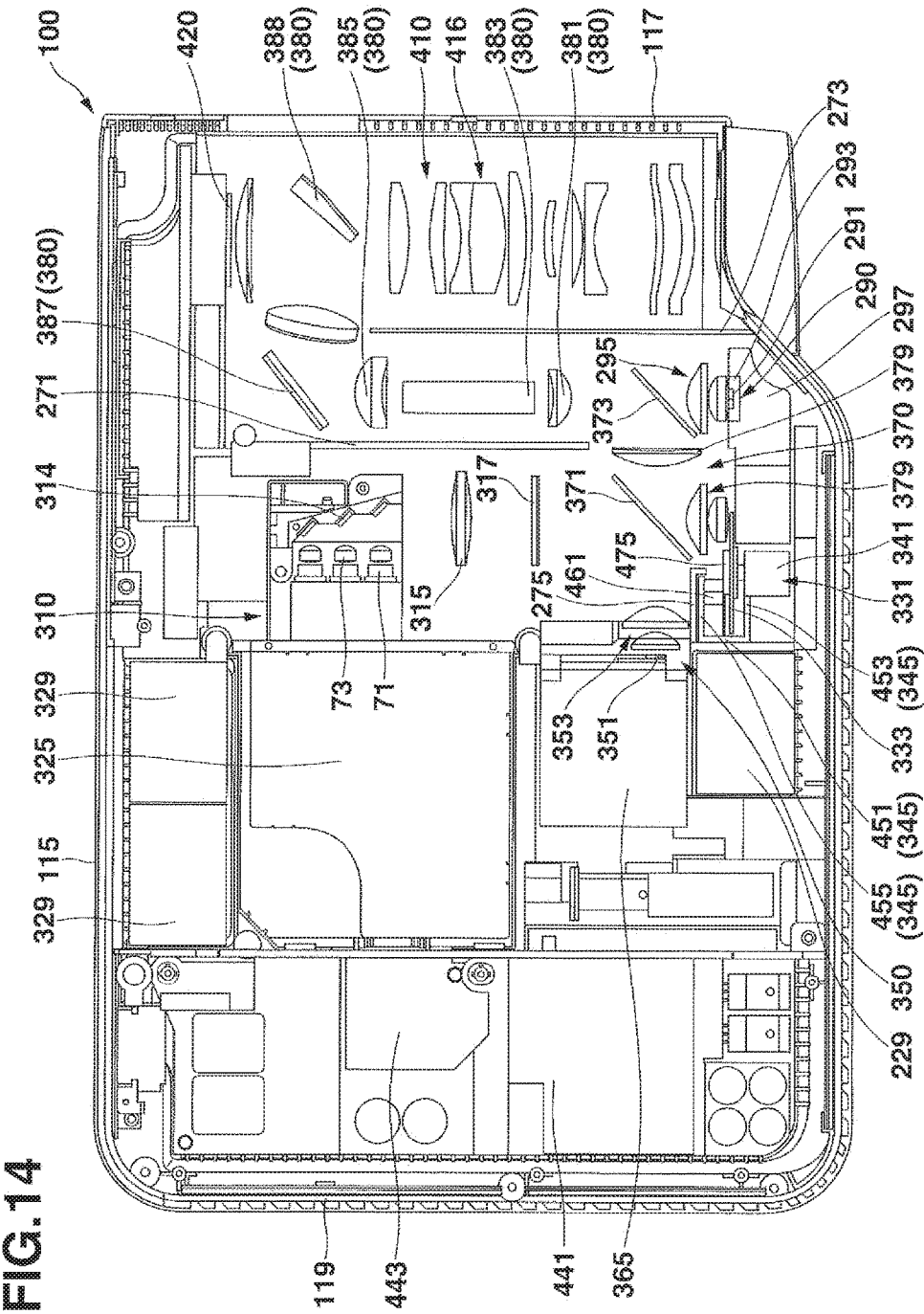
FIG. 14 is a plan view showing an example of an internal construction of the projector according to the second embodiment of the invention.
Figure 15:
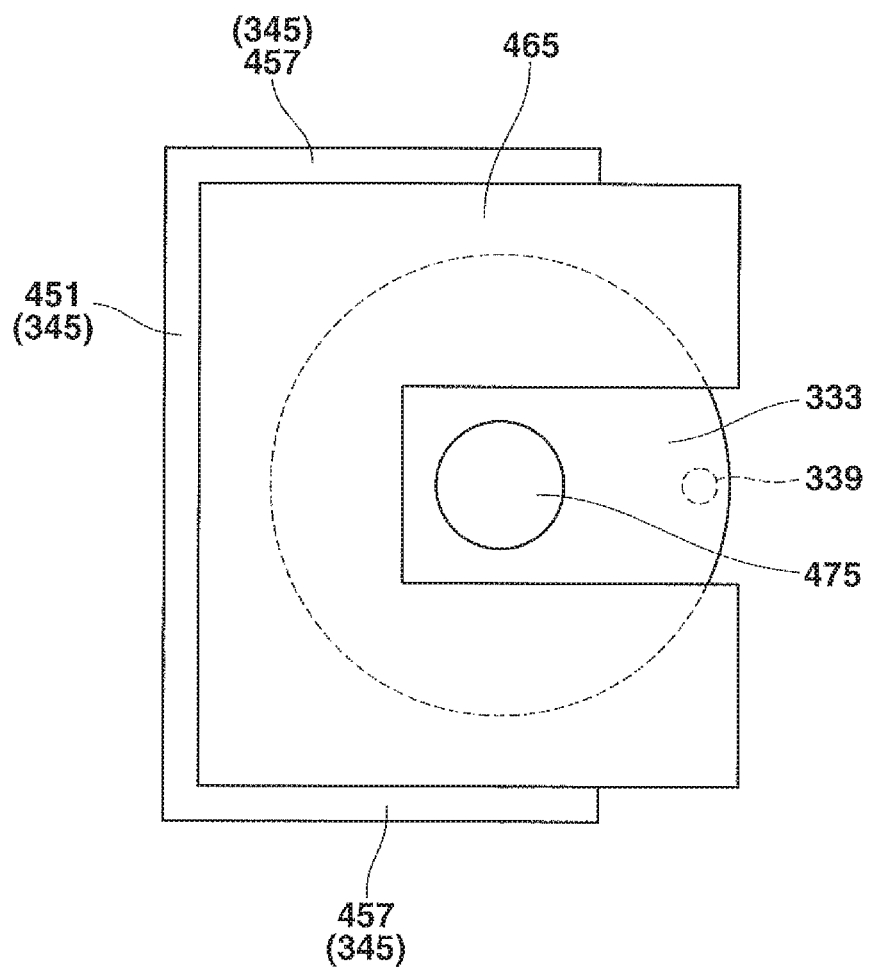
FIG. 15 is a schematic view showing an auxiliary heat dissipating plate of a luminous light emitting device of the projector according to the second embodiment of the invention.

Then, in this thin projector 100, as shown in FIG. 14, a main control circuit board 441 and a power supply control circuit board 443 are provided in the vicinity of an inner side of the right panel 119. A cooling fan 329 which cools an excitation light shining device 310 is disposed on an inner side of the back panel 115 in a position which lies closer to a center thereof. A cooling fan 329 which cools a red light source device 350, a blue light source device 290 and a luminous light emitting device 331 is disposed on an inner side of the front panel 113 in a position which lies at a center thereof.

The excitation light shining device 310 which includes a plurality of blue laser light emitting devices including corresponding collimator lenses is provided substantially at a center of the projector 100. An excitation light source heat sink 325 is provided on a right-hand side of the excitation light shining device 310. Further, laser beams which are emitted from the blue laser light emitting devices to the left in parallel to the back panel 115 are reflected in the direction of the front panel 113 by reflecting mirrors 314, so that the laser beams are shone onto a luminescent wheel 333 of a luminous light emitting device 331 by way of a collective lens 315 and a diffuse plate 317.

The projector 100 shown in FIG. 14, which is an image projection system, includes the red light source device 350 and the blue light source device 290. The red light source device 350 has a collective lens group 353 and a red light emitting diode which are held by a device holder 361 and is disposed rightwards and rearwards of the luminous light emitting device 331. The blue light source device 290 is disposed on a left-hand side of the luminous light emitting device 331 and includes a blue light emitting diode 291 which is held by a device holder 293 and a collective lens group 295 which collects light emitted from the blue light emitting diode 291.

In this way, the projector 100 includes the red light source device 350 and the blue light source device 290 which both utilize the light emitting diodes which are the semiconductor light emitting devices in addition to a green light source device which is made up of the excitation light shining device 310 and the luminous light emitting device 331. The luminescent wheel 333 of the luminous light emitting device 331 has no diffuse transmission area 337 but has a luminescent material area 335 which is made up of a layer of a green luminescent material. This luminescent material area 335 is formed into an annular shape and is provided on one side surface (a front surface) of the luminescent wheel 333 so as to extend along a full circumference thereof.

Then, this luminous light emitting device is disposed so that the luminescent wheel 333 becomes parallel to the front panel 113 at a substantially central position of the front panel 113 and is fixed to the lower case 140 so that an illumination spot 339 is situated to a left side of a rotational shaft of a motor 341 at the same height as that of the rotational shaft of the motor 341. The luminous light emitting device 331 has a wheel cover 345 which has internal heat dissipating plates 461 which are disposed closest to the surface of the luminescent wheel 333 where the luminescent material area 335 is provided and which covers substantially a right half of the luminescent wheel 333.

The red light source device 350 emits light in the red wavelength range to the left in parallel to the front panel 113. The blue light source device 290 emits light in the blue wavelength range in the direction of the back panel 115. Collective lenses 381, 385, a light tunnel 383 and a light axis turning mirror of a light source-side optical device 380 are provided at the rear of the blue light source device 290.

Further, the projector 100 includes, as a light guiding optical system 370, a first dichroic mirror 371, a second dichroic mirror 373 and collective lenses 379. The first dichroic mirror 371, which transmits light in the blue wavelength range and light in the red wavelength range and reflects light in the green wavelength range, is disposed at the rear of the collective lens 379 of the luminous light emitting device 331 and to a left side of the red light source device 350. The second dichroic mirror 373, which transmits light in the blue wavelength range and reflects light in the red wavelength range and light in the green wavelength range, is disposed at the rear of the blue light source device 290 and to the left side of the red light source device 350.

Consequently, light in the red wavelength range which passes through the first dichroic mirror 371 and light in the green wavelength range which is reflected by the first dichroic mirror 371 are shone onto the second dichroic mirror 373 by way of the collective lens 379 to thereby be reflected by the second dichroic mirror 373, so that the light in the red wavelength range and the light in the green wavelength range can be incident on the light tunnel 383 by way of the collective lens 381 of the light source-side optical device 380 together with light in the blue wavelength range which passes through the second dichroic mirror 373.

Then, the light axis turning mirror 387 of the light source-side optical device 380 reflects the lights which are incident thereon after having passed through the light tunnel 383 leftwards and obliquely downwards so that the lights are shone onto a shining mirror 388, whereby the light source lights are shone onto a display device 420 which is disposed near a left end of the back panel 115.

Then, the display device 420 reflects image light in the direction of the front panel 113 along a left panel, so that the image light is incident on a projection optical system unit 410 which is provided along an inner side of the left panel, whereby the image light is projected onto a screen by way of a movable lens group 416 and a fixed lens group.

In the thin projector 100, the center of the motor shaft of the motor 341 is at the same height as that of the illumination spot 339 where excitation light is shone onto the luminescent wheel 333. Thus, the luminous light emitting device 331 is fixed to the lower case 140 of the projector 100 together with the motor 341 by one of side cover plates 457 in such a state that a top cover plate 451 of the wheel cover 345 is disposed on a right-hand side of the luminous light emitting device 331 and that the other of the side cover plates 457 covers the motor 341 and a right half portion of the luminescent wheel 333 from thereabove.

There may also be a case where one of the side cover plates 457 is removed while the top cover plate 451, a front cover plate 453 and a rear cover plate 455 are fixed to a bottom plate of the lower cases 140 of the projector 100, so that a substantially half portion of the luminescent wheel 333 is covered from thereabove by a single side cover plate 457.

In this case, too, the luminescent wheel 333 is covered from thereabove by the single side cover plate 457 while a side portion of the luminescent wheel 333 is defined by the top cover plate 451 which rises from the bottom plate of the lower case 140, more than a half of the front of the luminescent wheel 333 is defined by the front cover plate 453, and more than a half of the rear of the luminescent wheel 333 is defined by the rear cover plate 455. Then, the internal heat dissipating plates 461 which are provided inside the front cover plate 453 are positioned closest to the front surface of the luminescent wheel 333 where the luminescent material area 335 is provided, so that air staying on the periphery of the luminescent wheel 333 is moved so as to flow from the center to the outer circumference of the luminescent wheel 333.

Although not shown in FIG. 14, similar to the embodiment shown in FIG. 11, there may also be a case where a lens holding member is provided which covers a left half of the luminescent wheel 333 where the illumination spot 339 is formed, and the collective lens 379 which is disposed closest to the front of the luminescent wheel 333 is fixed to the lens holding member, so that the whole of the luminescent wheel 333 is covered by the wheel cover 345 and the lens holding member.

In mounting the lens holding member 470 on the wheel cover 345, since the luminescent wheel 333 does not have a diffuse transmission area 337, a collective lens group 295 is only provided so as to face the surface of the luminescent wheel 333 where the luminescent material area 335 is provided. In addition, in the case of an auxiliary heat dissipating plate 465 being provided so as to face a rear surface of the luminescent wheel 333, as shown in FIG. 5, the auxiliary heat dissipating plate 465 can be shaped so that a U-shaped cutout is provided so as to avoid the motor 341 or a motor fixing portion 475 in such a way that an upper and lower side portions of the auxiliary heat dissipating plate 465 extend sideways.

In this thin projector 100, too, an internal partition wall 271 is provided between the optical path of excitation light and the light source-side optical device 380 such as the light tunnel 383, a main partition wall 273 is provided between the light source-side optical device 380 and the projection optical system unit 410, and an auxiliary partition wall 275 is provided between the red light source device 350 and the luminous light emitting device 331. Then, in cooling an excitation light source heat sink 325 and a blue light source heat sink 297, a main control circuit board 441, a power supply circuit board 443 and the like by outside air taken in from the inlet and outlet holes 189 of the projector 100, outside air so used is discharged to the outside of the projector 100 without being allowed to flow into the optical paths of light source light such as excitation light and lights of the three primary colors.

While the embodiments of the invention have been described heretofore, these embodiments are presented as the examples and are not intended at all to limit the scope of the invention. The novel embodiments can be carried out in other various forms, and hence, various omissions, replacements and modifications can be made thereto without departing from the spirit and scope of the invention. The resulting embodiments and their modifications are included in the spirit and scope of the invention and are also included in the scope of inventions claimed for patent in claims and their equivalents.

What is claimed is:

1. A luminous light emitting device, comprising:
a motor;
a luminescent wheel which is rotated by the motor; and
a wheel cover which covers part of the luminescent wheel,
wherein
the wheel cover has a plurality of internal heat dissipating plates which are disposed in an inside thereof so as to extend from a central portion of the luminescent wheel towards an outer circumference of the luminescent wheel wherein the plurality of internal heat dissipating plates are disposed so as to extend from the central portion towards the outer circumference of the luminescent wheel in such a way as to intersect obliquely radial directions of the luminescent wheel which originate from a center thereof.

2. The luminous light emitting device according to claim 1, wherein the plurality of internal heat dissipating plates are disposed in such a way that a thickness thereof becomes gradually thicker as the internal heat dissipating plates extend from the central portion to the outer circumference of the luminescent wheel.

3. The luminous light emitting device according to claim 1, wherein an internal heat dissipating plate which is shorter in length than the plurality of internal heat dissipating plates is disposed between the adjacent internal heat dissipating plates on an outer circumferential side of the luminescent wheel.

4. The luminous light emitting device according to claim 1, wherein the plurality of internal heat dissipating plates are disposed so as to be inclined relative to a rotational shaft at the center of the luminescent wheel.

5. The luminous light emitting device according to claim 1, wherein the plurality of internal heat dissipating plates are disposed on a surface side of the luminescent wheel where a luminescent material area is formed.

6. The luminous light emitting device according to claim 1, wherein the wheel cover has an auxiliary heat dissipating plate on a surface side of the luminescent wheel where no luminescent material area is formed, the auxiliary heat dissipating plate being disposed substantially parallel to the luminescent wheel and formed of a well heat conductive material which includes either metal or a highly heat conductive resin.

7. The luminous light emitting device according to claim 1, wherein the wheel cover and the internal heat dissipating plates are formed of a well heat conductive material which includes either metal or a highly heat conductive resin.

8. The luminous light emitting device according to claim 1, comprising further:

a lens holding member which covers the other part of the luminescent wheel which is different from the part thereof, wherein the lens holding member comprises a collective lens which collects excitation light onto an illumination spot on the luminescent material area of the luminescent wheel, and wherein the whole of the luminescent wheel is covered by the lens holding member and the wheel cover.

9. The luminous light emitting device according to claim 1, wherein the wheel cover covers the luminescent wheel and the motor so as to accommodate the luminescent wheel and the motor therein.

10. A light source unit, comprising:

the luminous light emitting device according to claim 1;
an excitation light shining device; and
a semiconductor light emitting device which emits light in a wavelength range which is different from a wavelength range of luminous light which is emitted from the luminescent wheel.

11. An image projection system, comprising:

the light source unit according to claim 10;
a display device which forms image light when light emitted from the light source unit is shone onto the display device;
a projection optical system which projects the image light formed by the display device onto a screen; and
a projector control unit for controlling the display device and the light source unit.

12. A luminous light emitting device, comprising:

a motor;
a luminescent wheel which is rotated by the motor; and
a wheel cover which covers part of the luminescent wheel, wherein the wheel cover has a plurality of internal heat dissipating plates which are disposed in an inside thereof so as to extend from a central portion of the luminescent wheel towards an outer circumference of the luminescent wheel, wherein the plurality of internal heat dissipating plates are disposed in such a way that a thickness thereof becomes gradually thicker as the internal heat dissipating plates extend from the central portion of the luminescent wheel to the outer circumference of the luminescent wheel.

13. The luminous light emitting device according to claim 12, wherein the plurality of internal heat dissipating plates are disposed so as to extend from the central portion towards the outer circumference of the luminescent wheel in such a way as to intersect obliquely radial directions of the luminescent wheel which originate from a center thereof.

14. The luminous light emitting device according to claim 12, wherein an internal heat dissipating plate which is shorter in length than the plurality of internal heat dissipating plates is disposed between the adjacent internal heat dissipating plates on an outer circumferential side of the luminescent wheel.

15. The luminous light emitting device according to claim 12, wherein the plurality of internal heat dissipating plates are disposed so as to be inclined relative to a rotational shaft at the center of the luminescent wheel.

16. The luminous light emitting device according to claim 12, wherein the wheel cover has an auxiliary heat dissipating plate on a surface side of the luminescent wheel where no luminescent material area is formed, the auxiliary heat dissipating plate being disposed substantially parallel to the luminescent wheel and formed of a well heat conductive material, and the well heat conductive material includes either metal or a highly heat conductive resin.

17. The luminous light emitting device according to claim 12, wherein the plurality of internal heat dissipating plates are disposed on a surface side of the luminescent wheel where a luminescent material area is formed.

18. The luminous light emitting device according to claim 12, wherein the wheel cover and the internal heat dissipating plates are formed of a well heat conductive material which is included either metal or a highly heat conductive resin.

19. The luminous light emitting device according to claim 12, comprising further:

a lens holding member which covers the other part of the luminescent wheel which is different from the part thereof, wherein the lens holding member comprises a collective lens which collects excitation light on to an illumination spot on the luminescent material area of the luminescent wheel, and wherein the whole of the luminescent wheel is covered by the lens holding member and the wheel cover.

20. The luminous light emitting device according to claim 12, wherein the wheel cover covers the luminescent wheel and the motor so as to accommodate the luminescent wheel and the motor therein.

21. A light source unit, comprising:

the luminous light emitting device according to claim 12;

an excitation light shining device; and a semiconductor light emitting device which emits light in a wavelength range which is different from a wavelength range of luminous light which is emitted from the luminescent wheel.

22. An image projection system, comprising:

the light source unit according to claim 21;

a display device which forms image light when light emitted from the light source unit is shone onto the display device;

a projection optical system which projects the image light formed by the display device onto a screen; and a projector control unit for controlling the display device and the light source unit.

23. A luminous light emitting device, comprising:

a motor;

a luminescent wheel which is rotated by the motor; and a wheel cover which covers part of the luminescent wheel, wherein the wheel cover has a plurality of internal heat dissipating members in an inside of the wheel cover.

* * * * *